United States Patent [19]
Sidman

[11] Patent Number: 5,115,360
[45] Date of Patent: May 19, 1992

[54] EMBEDDED BURST DEMODULATION AND TRACKING ERROR GENERATION

[75] Inventor: Michael D. Sidman, Colorado Springs, Colo.

[73] Assignee: Digital Equipment Corporation, Maynard, Mass.

[21] Appl. No.: 502,512

[22] Filed: Mar. 4, 1991

Related U.S. Application Data

[60] Division of Ser. No. 490,504, Feb. 28, 1990, which is a continuation of Ser. No. 308,963, Feb. 10, 1989, abandoned, which is a continuation of Ser. No. 106,017, Oct. 1, 1987, abandoned, which is a continuation of Ser. No. 926,885, Nov. 6, 1986, abandoned, which is a continuation of Ser. No. 376,971, May 10, 1982, abandoned.

[51] Int. Cl.⁵ .............................................. G11B 5/596
[52] U.S. Cl. ............................. 360/77.08; 360/77.05
[58] Field of Search ............... 360/77.01, 77.02, 77.04, 360/77.05, 77.07–77.11

[56] References Cited

U.S. PATENT DOCUMENTS

| | | |
|---|---|---|
| 3,534,344 | 10/1970 | Santana . |
| 3,691,543 | 9/1972 | Mueller . |
| 3,818,502 | 6/1974 | Chien et al. . |
| 3,893,180 | 7/1975 | Braun et al. . |
| 3,994,016 | 11/1976 | Moghadam . |
| 4,027,338 | 5/1977 | Kril . |
| 4,048,660 | 9/1977 | Dennison et al. . |
| 4,052,741 | 10/1977 | Baca et al. . |
| 4,072,990 | 2/1978 | Case et al. . |
| 4,101,942 | 7/1978 | Jacques . |
| 4,115,823 | 9/1978 | Commander et al. . |
| 4,149,200 | 4/1979 | Card . |
| 4,172,267 | 10/1979 | Sidman . |
| 4,238,809 | 12/1980 | Fujiki et al. . |
| 4,297,737 | 10/1981 | Andresen et al. . |
| 4,326,226 | 4/1982 | Touchton et al. . |
| 4,377,827 | 3/1983 | Rose . |
| 4,424,543 | 1/1984 | Lewis et al. . |

FOREIGN PATENT DOCUMENTS

| | | |
|---|---|---|
| 0009087 | 4/1980 | European Pat. Off. . |
| 0034938 | 9/1981 | European Pat. Off. . |
| 1424516 | 10/1968 | Fed. Rep. of Germany . |
| 2629710 | 1/1977 | Fed. Rep. of Germany . |
| 2755652 | 6/1978 | Fed. Rep. of Germany . |
| 2319179 | 2/1977 | France . |
| 2368114 | 5/1978 | France . |
| 2375688 | 7/1978 | France . |
| WO81/01903 | 7/1981 | PCT Int'l Appl. . |

OTHER PUBLICATIONS

IBM Tech. Disc. Bull., vol. 18, No. 10, Mar. 1976, pp. 3425–3425, Oswald, "Track Following Servo System".
IBM Tech. Disc. Bull., vol. 19, No. 7, Dec. 1976, pp. 2686–2687, Brownback et al., "Measuring and Adjusting Speed of Magnetic Disk Access Arm".
IBM Tech. Disc. Bull., vol. 20, No. 8, Jan. 1978, pp. 3243–3247, Deremer et al., "Sector Servo Method".
IBM Tech. Disc. Bull., vol. 21, No. 2, Jul. 1978, pp. 804–805, Herrington et al., "Quad-Burst PES System for Disk File Servo".

*Primary Examiner*—Aristotelis Psitos
*Assistant Examiner*—Steven R. Garland
*Attorney, Agent, or Firm*—Cesari and McKenna

[57] ABSTRACT

A disk drive comprising circular data tracks divided into sectors each of which includes a data field and a servo field containing embedded servo signals, an embedded signal sensor for sensing embedded servo signals on a data surface and a head positioning system for positioning a read/write head over a selected data track. The servo fields in the data tracks contain first and second embedded servo signals of substantially constant amplitude high-frequency bursts offset relative to each other and disposed on alternate sides of the track centerlines. The sensed signals corresponding to the first and second embedded servo signals are sampled and compared to provide a track error signal for positioning the read/write head over a selected data track.

10 Claims, 20 Drawing Sheets

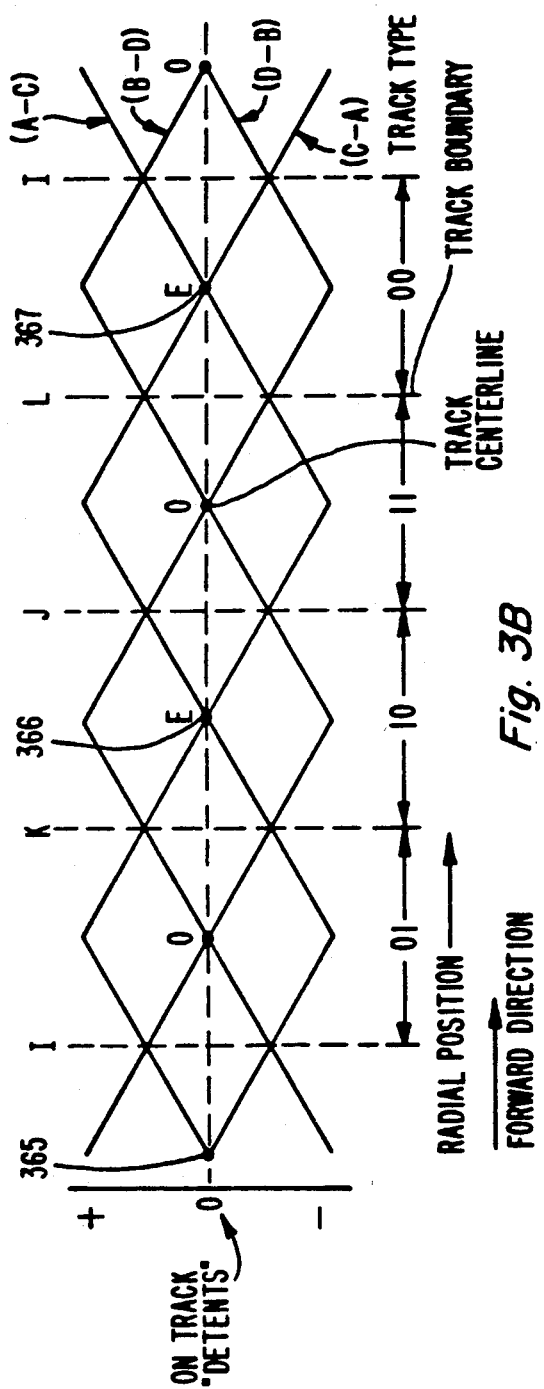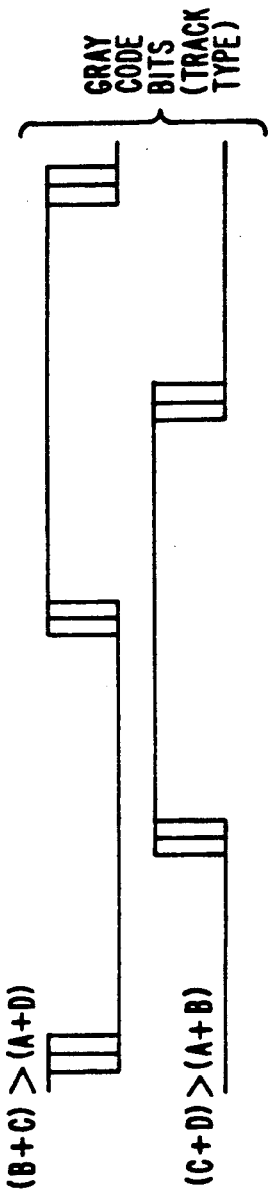
Fig. 3B
Fig. 3C

CONDITIONS FOR VALID NEXT STATE

| PRESENT STATE | NEXT STATE | |
|---|---|---|
| | FORWARD SEEK | REVERSE SEEK |
| (B+C)>(A+D), (C+D)>(A+B) | (B+C)>(A+D), (C+D)>(A+B) | (B+C)>(A+D), (C+D)>(A+B) |
| 0,0 | 0,1 | 1,0 |
| 0,1 | 1,1 | 0,0 |
| 1,1 | 1,0 | 0,1 |
| 1,0 | 0,0 | 1,1 |

Fig. 5

EMBEDDED SERVO DATA DEMODULATOR 36

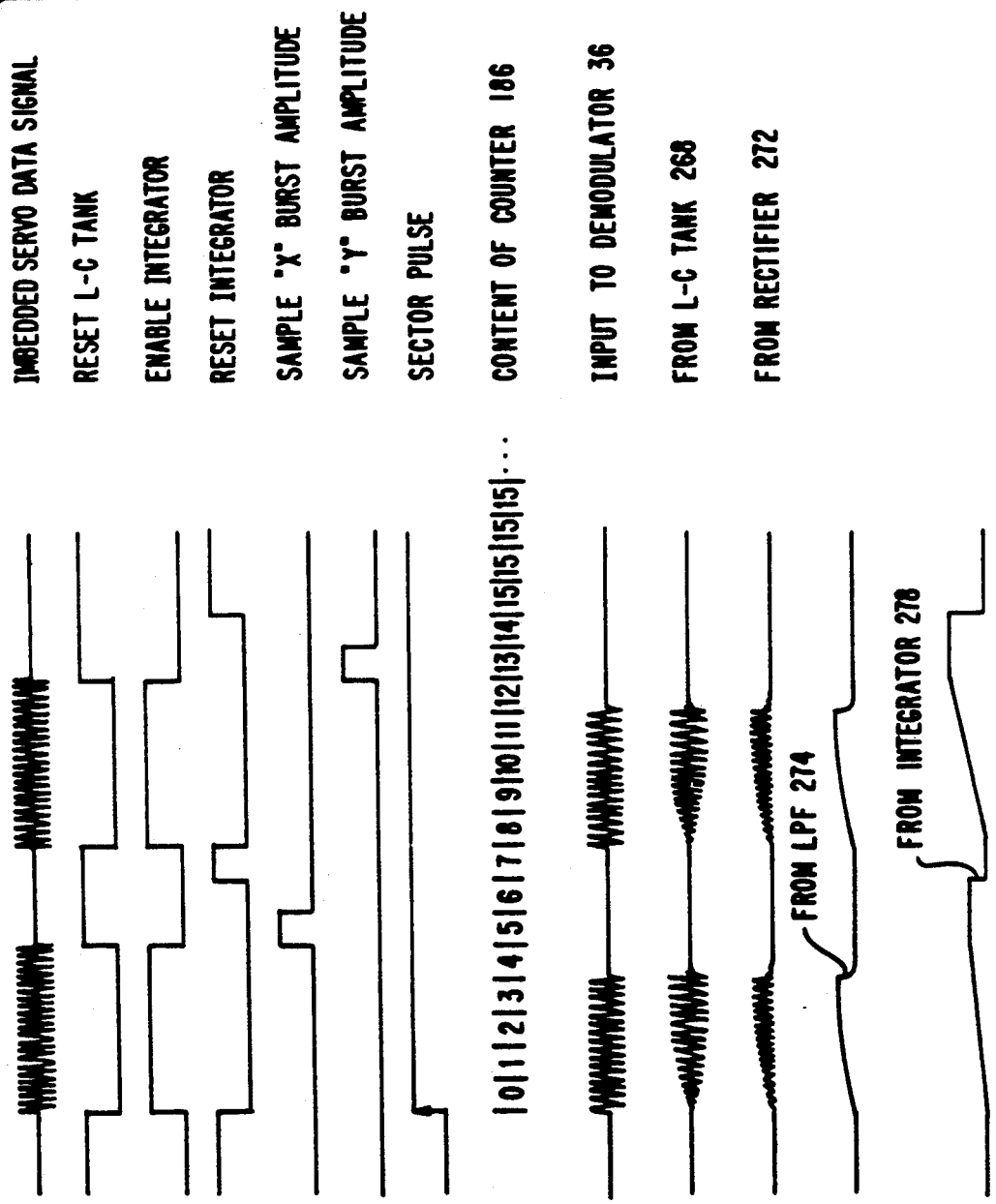

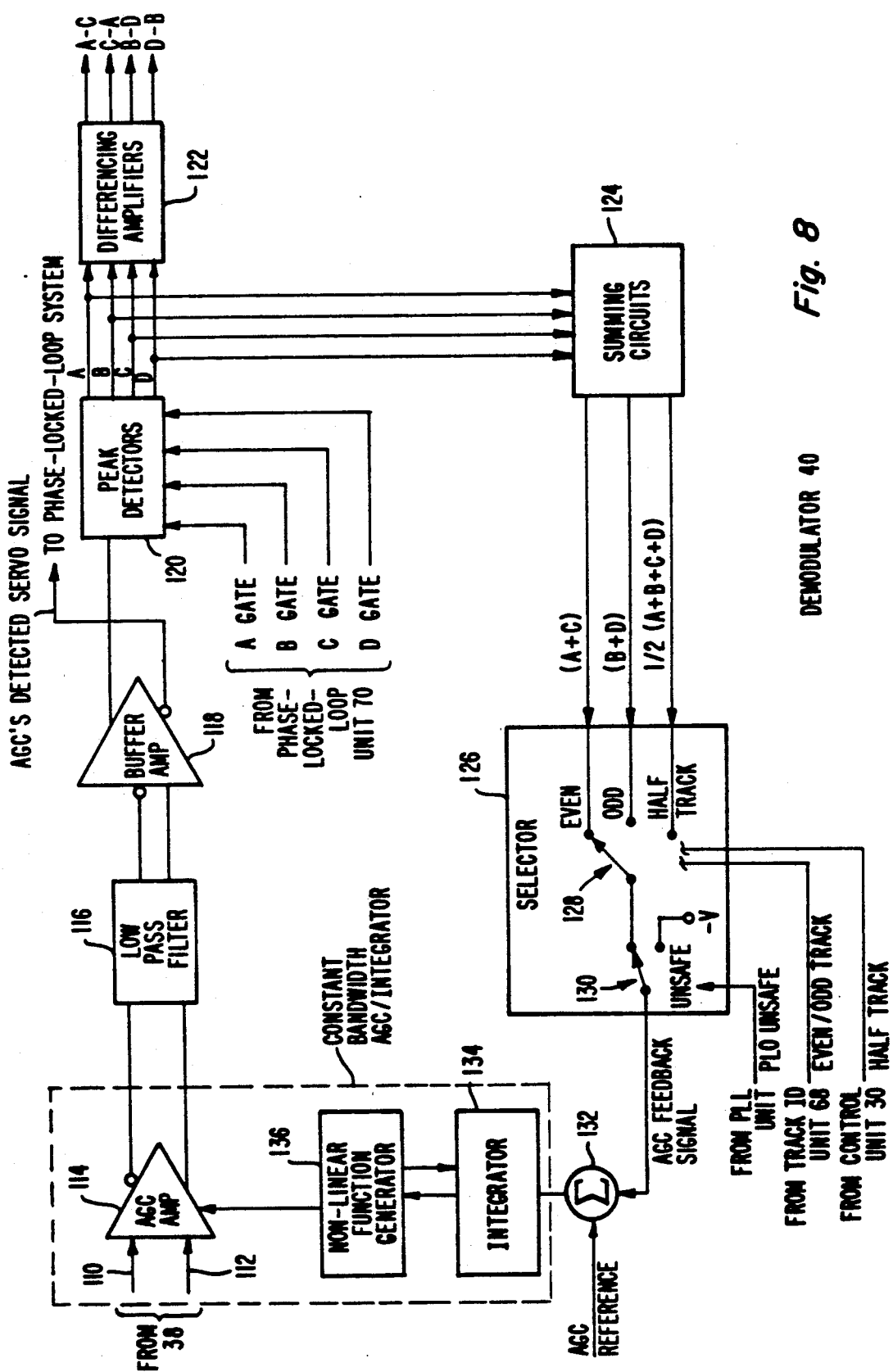

COMPOSITE POSITION ESTIMATION FREQUENCY RESPONSES
TO SINUSOIDAL HEAD POSITION ERRORS
OVER A RANGE OF FREQUENCIES

EMBEDDED BURST DEMODULATION AND TRACKING ERROR GENERATION

CROSS REFERENCE TO RELATED PATENT APPLICATIONS

This invention is a divisional application of prior pending application Ser. No. 07/490,504, filed on Feb. 28, 1990, entitled CONTINUOUS-PLUS-EMBEDDED SERVO DATA POSITION CONTROL SYSTEM FOR MAGNETIC DISK DEVICE, which is a continuation application of prior application Ser. No. 07/308,963, filed on Feb. 10, 1989, now abandoned which was a continuation of prior application Ser. No. 07/106,017, filed on Oct. 1, 1987, now abandoned, which was a continuation of prior application Ser. No. 06/926,885, filed on Nov. 6, 1986, now abandoned, which was a continuation of prior application Ser. No. 06/376,971, filed on May 10, 1982, now abandoned.

This invention is also related to commonly assigned U.S. Pat. No. 4,536,809, titled ADAPTIVE MISPOSITION CORRECTING METHOD AND APPARATUS FOR MAGNETIC DISK SERVO SYSTEM, issued on Aug. 20, 1985 by the same inventor hereof, the application having been incorporated by reference in pending application Ser. No. 07/490,504.

BACKGROUND OF THE INVENTION

A magnetic disk device, commonly termed a "disk drive", is a storage device used in data processing system for storing retrievable digital data in magnetic form. The data is stored on a rotating magnetic disk in a set of concentric circular patterns termed "tracks". A read/write head is mounted on a carriage that moves the head radially to bring it to a desired track and then maintains it in position over that track so that the head can record a series of data bits or, alternatively, retrieve a series of bits from the track as the latter rotates under the head. Large-capacity disk drives incorporate a plurality of such disks mounted for rotation together on a single spindle. A least one separate read/write head is used for each disk surface, all the heads being mounted on the same carriage to provide a comb-like arrangement in which the heads move in and out in unison.

The carriage on which the read/write heads are mounted is incorporated in a servo system which performs two distinguishable functions in moving the carriage. The first of these is a "seek" or "access" function in which the servo system moves a read/write head to a selected track from a previous track which may be a substantial number of tracks distant. When the head reaches the desired track, the servo system commences a "track following" function in which it accurately positions the head over the centerline of the selected track and maintains it in that position as successive portions of the track pass by the head.

The seek and track-following functions impose different constraints on the servo system. During a seek operation the carriage must be moved as fast as possible so as to minimize the time required for that operation. Velocity accuracy is also important in establishing a velocity trajectory and good arrival characteristics. During a track-following operation, on the other hand, position accuracy is a most important factor. The accuracy with which the read/write head can be made to follow the track centerline is a determining factor for the track density on the disk. That is, the closer the head can be made to follow track centerlines, the closer together can the tracks be spaced.

The head-positioning servo system senses the position of the read/write head by means of servo signals recorded in tracks on the disk pack. In one conventional arrangement the servo signals are recorded on a dedicated servo surface, i.e., a surface which contains only these signals. In another conventional arrangement the servo signals are embedded in the data. That is, they are recorded in servo fields at the beginnings of the data track sectors. The embedded servo signals have the capability of providing more accurate data head position information than the dedicated servo signals. However, because they are spaced apart by the data sectors on the data tracks and are thus sampled periodically at a relatively low rate, they are incapable of providing position signals having high frequency components. On a dedicated servo surface, on the other hand, the servo signals on each track are essentially continuous and thus they can provide position information having a substantially broader frequency band.

DESCRIPTION OF PRIOR ART

U.S Pat. No. 4,115,823, issued to Commander, et al., and U.S. Pat. No. 4,072,990, issued to Case, et al., describe a servo control system using both embedded servo signals and signals from a dedicated servo surface. The signals from the dedicated surface are used during track seeking operations. During track following operations, the system combines the signals from both sources into a "hybrid" position error signal that is used to control the position of a read/write head. Specifically, the hybrid signal is a combination of the low frequency components of the embedded servo signal with the high frequency components of the dedicated servo signal. This allows a wide-band hybrid position error signal while maintaining the accuracy provided by the low frequency components of the embedded signals. Still, this arrangement does not provide the positioning accuracy needed for the increased track density desired in newer, high performance disk systems.

SUMMARY OF THE INVENTION

The principal object of the invention is to provide a multi-platter disk drive having an improved head positioning system capable of positioning the data heads with relatively small error.

A more specific object is to provide a disk drive in which the head positioning system makes use of both dedicated and embedded servo data.

Another object of the invention is to provide a disk drive of the above type capable of closely following data track centerlines and therefore capable of a relatively high track density.

A further object of the invention is to provide a disk drive of the above type in which the servo data can be recorded at relatively low cost.

The disk described herein incorporates a number of features which accomplish the foregoing objects. First, instead of combining only the low frequency components of the embedded servo signal with the high frequency components of the dedicated servo signal, I combine the entire embedded servo signal with the high frequency components of the dedicated servo signal to provide the hybrid or composite track error signal used in the servo system. As will be seen from the description below, this means that the composite error signal is comprised almost entirely of the embedded servo signal and, thus, is capable of following the data tracks more closely than the prior hybrid systems.

As a further feature of the invention, I use high frequency bursts as the embedded servo signals. Specifically, each sector on a data track begins with an embedded servo field containing first a high frequency burst bordering the track centerline on one side and then a second high frequency burst bordering the centerline on the opposite side. Thus, as the servo field passes under the read/write head, the head senses first one burst and then the other. If the head is displaced from the desired on-centerline position, the received amplitude of one burst will be grater than that of the other and it is this difference that is used as the embedded servo position error signal.

This type of embedded servo signal has been used before, but it has not, to my knowledge, been used in conjunction with a dedicated servo surface. It provides an important advantage resulting from the fact that the circumferential positions of the servo bursts need not be maintained with in tight tolerances as discussed below. Thus, the embedded servo signals can be written on the data surfaces by the same disk drive that reads and writes data on these surfaces. That is, a disk assembly with a pre-recorded dedicated servo surface can be mounted on the drive and the drive can then use the servo information from the dedicated disk to radially position the heads on the data surfaces and time the writing of the embedded servo bursts. With other types of embedded servo formats, the servo signals must be circumferentially located with a higher degree of accuracy and fluttering of the data heads relative to the servo head prevents the attainment of such accuracy. Accordingly, both the dedicated and embedded servo information must be pre-recorded on a highly expensive machine designed for that purpose.

Another feature of the drive is the use of novel automatic gain control circuits, described below, in the detection of the servo signals. These gain control circuits provide wide band widths in the gain control loops and thus high-gain loops can be used for close following of variations in the strengths of the recorded servo signals.

Still another feature is the use of a Gray code arrangement in detecting the passing of track boundaries during seek operations for identification of the tracks passing the read/write heads. The system includes circuitry which makes use of the Gray code in preventing signal jitter from providing false track identifications.

The drive also includes a number of other features which are described below.

BRIEF DESCRIPTION OF THE DRAWINGS

FIGS. 3A and 3B represent signals derived from the dedicated servo surface as a function of the radial position of the servo head.

FIG. 3C graphically illustrates the derivation of the Gray code representation of track identification.

FIG. 5 is a table of logic relationships governing the output of the track identification unit depicted in FIG. 4.

FIG. 7 is a diagram of various timing relationships in the circuit of FIGS. 6A and 6B.

FIG. 8 is a circuit diagram of the dedicated servo data demodulator of FIG. IA.

DESCRIPTION OF AN ILLUSTRATIVE EMBODIMENT

Figure 1A:
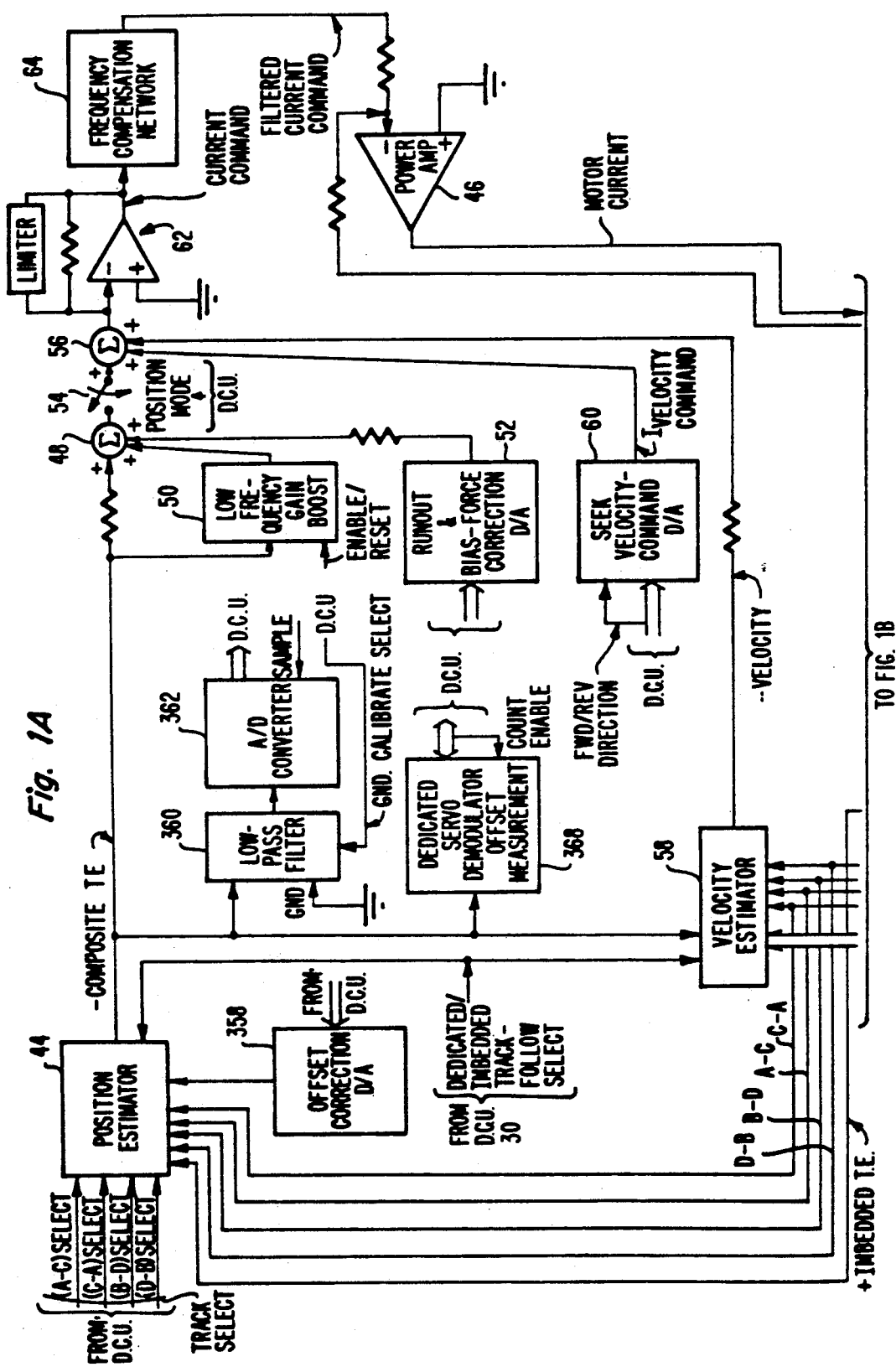
FIGS. 1A and 1B contain a diagram of a disk drive embodying the invention.
Figure 1B:
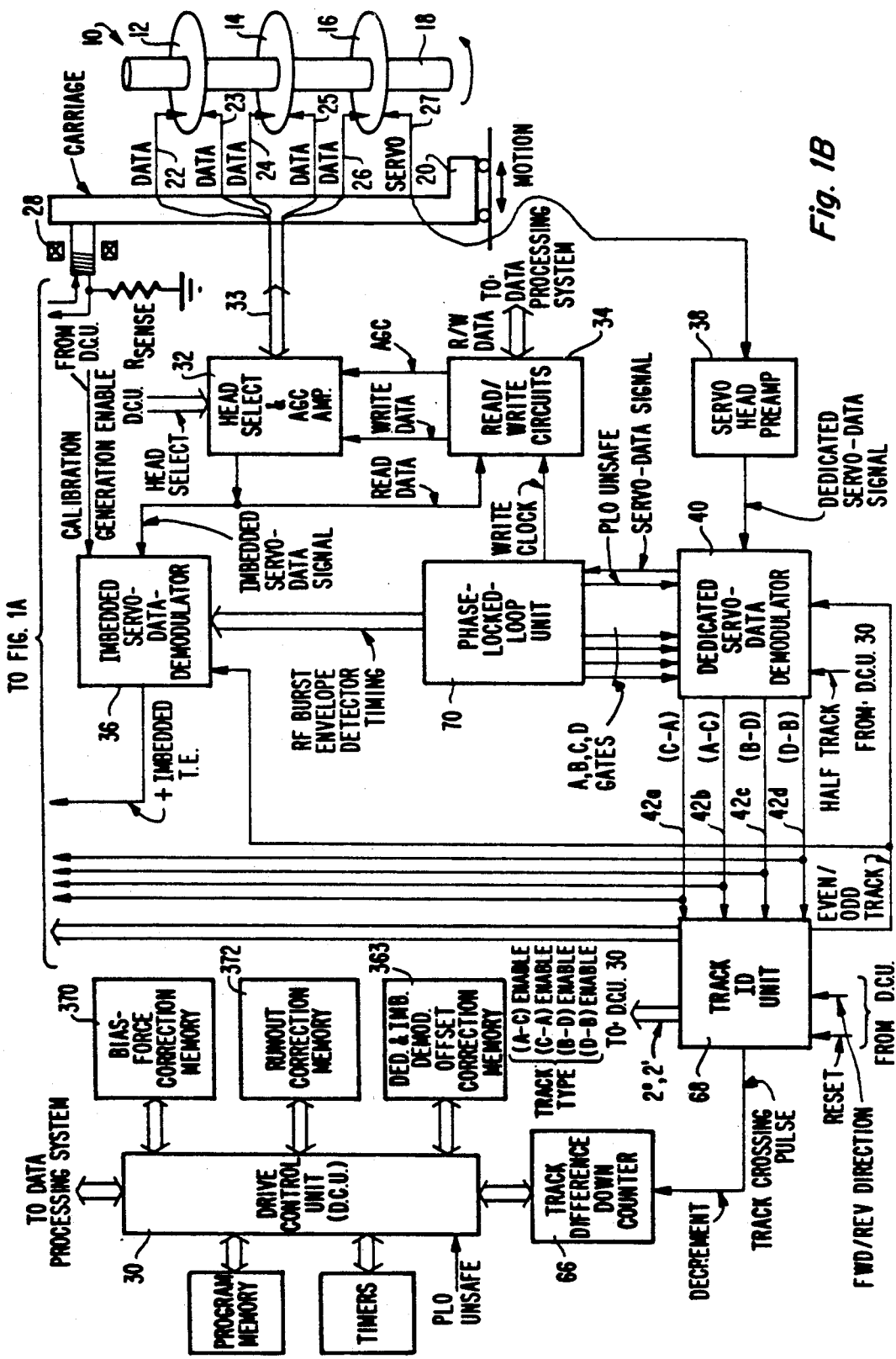

FIGS. 1A and 1B depict in block diagram form a disk drive incorporating a head positioning system embodying the invention. A multi-platter disk assembly 10 comprises a plurality of stacked magnetic disks 12, 14 and 16 which are mounted in spaced relation for rotation with a spindle 18. A movable carriage 20 supports a set of read/write heads or transducers 22–26, positioned to read and write data from the upper and lower surfaces of the disks 12 and 14 and the upper surface of the disk 16. The carriage also supports a read-only head 27 positioned to read servo information recorded on the bottom surface of the disk 16, this surface being a dedicated servo surface.

The carriage 20 is moved to and fro by an electromagnetic actuator 28 to displace the respective transducers in and out radially with respect to the disks 12, 14 and 16 so as to access selected circular tracks of magnetically recorded information on the disks. The tracks are selected under the overall control of a drive control unit 30 that receives instructions from a data processing system to which the depicted disk system is connected. Typically the drive control unit will receive instructions to read or write data on a selected track on a selected data surface of the disk assembly 20. The present invention is directed to the servo system that moves a read/write head to a selected track and maintains it in position over the center line of that track during a reading or writing operation.

More specifically, with further reference to FIG. 1B, the data transducers 22–26 are connected to a head selection and amplifying unit 32 by a set of conductors 34. The unit 32 selects a data surface in the disk assembly 10 by connecting to one of the data heads 22–26 in response to head select signals from the drive control unit 10. The unit 32 is also connected to read/write circuits 34 which convey data from the disk assembly 10 to the data processing system during read operations and in the opposite direction during write operations. The circuits 34 also provide an automatic gain control signal for the unit 32. During both read and write operations, embedded servo signals are read and write operations, embedded servo signals are read from the selected data track and they are passed by the unit 32 to an embedded servo data demodulator 36.

At the same time the output of the servo transducer 27 is applied to a conventional preamplifier 38 whose output in turn is fed to a dedicated servo data demodulator 40. The output of the demodulator 40 appears in an essentially time multiplex manner on four conductors 42A–42D. These dedicated track position signals are passed to a position estimator 44 along with an embedded track error signal from the demodulator 36. The output of the position estimator 44 is a composite track error (COMPOSITE TE) signal which, after modifications described herein, is applied to a power amplifier 46 which controls the actuator 28, thereby to close the servo loop and thus bring a data head to the desired track and maintain it on the centerline of that track.

More particularly, the composite track error signal from the position estimator 44 is summed in a summer 48 with the output of a low frequency gain boost unit 50 and with a misposition correction signal from a digital-/analog converter 52. The input to the converter 52 is a digital runout and bias force correction signal derived by the drive control unit 30 in a manner to be described below. The output of the summer 48 in turn is passed through a mode switch 54 to a second summer 56. The summer 56 adds to the track error signal a velocity estimator 58 and a velocity command derived by a digital/analog converter 60 from signals provided by the drive control unit 30.

The output of the summer 56 is passed through a limiting amplifier 62 and a frequency compensation network 64 before being applied to the power amplifier 46.

During seek operations the switch 54 is open so that the input to the summer 56 consists only of (1) the velocity command signal from the drive control unit 30, and (2) the velocity feedback signal from the velocity estimator 58 which is subtracted from the velocity command signal by the summer 56 to provide a velocity error feedback signal.

The drive control unit 30 provides the velocity command, which is based in a well-known manner on the distance of the servo transducer from the track to which it is being moved. This distance, which may be termed coarse position information is provided by a track difference down counter 66 which is initially loaded by the drive control unit 30 with the number of tracks to be crossed in moving to the selected track. The counter then counts down in response to a track crossing pulse emitted by a track identification unit 68 each time the servo head 27 passes over a track on the way to the destination track. The track identification unit 68 each time the servo head 27 passes over a track on the way to the destination track. The track identification unit 68 in turn responds to output signals from the dedicated servo data demodulator 40 on conductors 42B–42D.

When the selected track is approached, the switch 54 is closed and it remains closed during the subsequent track-following operation, so that the summer 56 receives the composite track error signal from the position estimator 44 as modified in the summer 48. During this mode of operation the digital/analog converter 60 receives no velocity command from the drive control unit 30. However, a velocity feedback signal is provided by the estimator 58.

The velocity estimator 58 derives its velocity signals from the dedicated servo position signals on conductors 42A–42D during seek operations and from the composite track error signal provided by the position estimator 44 during the track following operations. It is switched between these two modes of operation by a control signal from the drive control unit 30 as indicated in FIG. 1A.

Timing signals for the drive are derived by a phase-locked loop unit 70 described below. In particular, the unit 70 provides appropriate timing signals for operation of the servo demodulators 36 and 40.

Figures 2A, 2B:
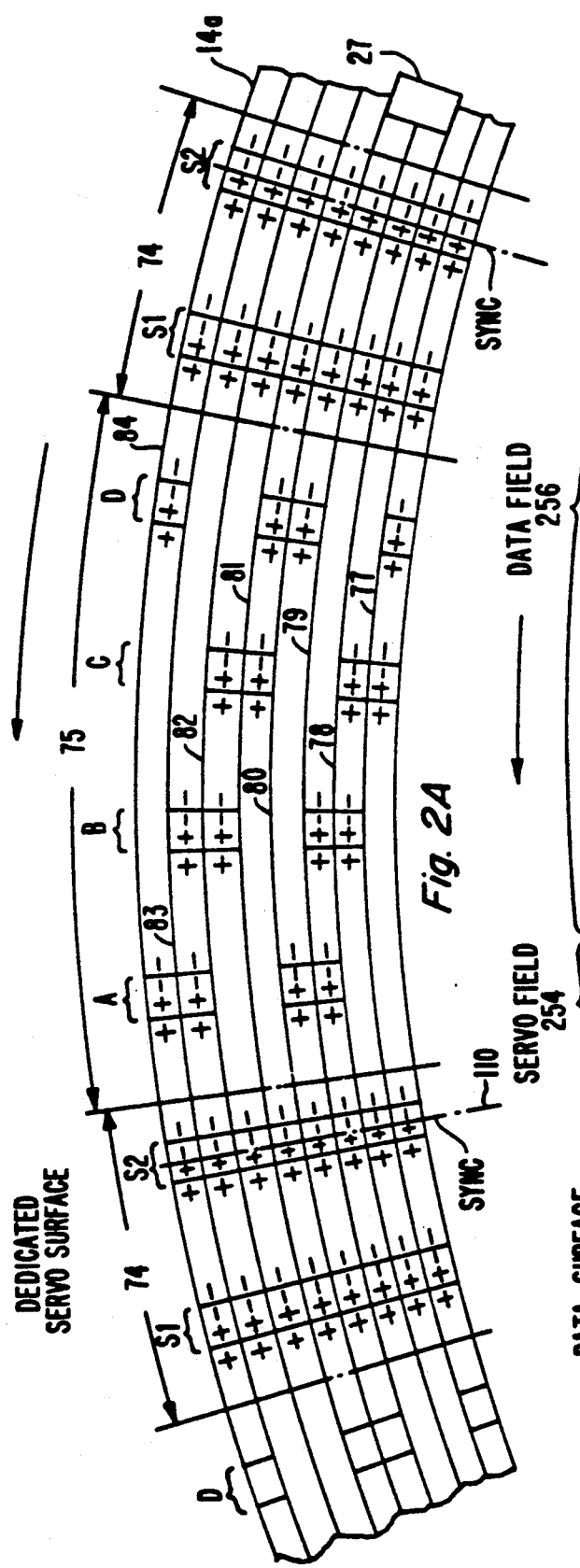
FIG. 2A schematically depicts the arrangement of signals on the dedicated servo surface.
FIG. 2B schematically depicts the arrangement of embedded servo signals on a data surface.

FIG. 2A depicts the configuration of the flux transitions recorded on the dedicated servo surface of the disk 16 (FIG. 1B). The servo information is recorded in tracks whose centerlines are represented by arcuate lines. The servo information is read by the servo head 27, which has an effective width equal to two track widths. The servo surface is preferably polarized in one direction, for example right to left in the drawing, and the servo signals are recorded as dibits, each of which comprises a first transition from right-to-left polarization to a left to right polarization and a second transition returning the polarization to right-to-left. These dibits are depicted with "+/+" legends indicating the generation of positive pulses in the head 27, followed by "−/−" transitions indicating the generation of negative pulses.

The servo signals in FIG. 2A are arranged in frames, each of which comprises a synchronizing field 74 containing synchronizing dibits S1 and S2, followed by a positioning field 7 in which the dibits are arranged in radially extending groups designated as A, B, C, and D. The signals generated by the head 27 in reading these positioning dibits are used by the system to determine the radial position of the head.

More specifically, in the circumferential positions B and D the positioning dibits are centered about alternate even-numbered tracks with the B dibits centered, for example, on tracks 78 and 82 and the D dibits centered on tracks 80 and 84. In similar fashion the A and C dibits are centered on alternate odd-numbered tracks 77, 79, 81, and 83. Each dibit has a width equal to two track widths. Dibit patterns of this type are disclosed in IBM Technical Disclosure Bulletin, Vol. 18, No. 10, March, 1976, by R. K. Oswald and in U.S. Pat. No. 4,238,809, issued to Fujiki, et al.

In the system described herein, there is an S2 dibit 30 in every synchronizing field 74. However, in each track the S1 dibit is omitted in a pattern of frames to provide an index mark. Additionally, there are continuous patterns of missing S1 dibits in inner and outer guard bands (not shown). These patterns are not a part of this invention. However, in the embodiment described herein the S1 dibit is never omitted from two successive frames, a factor which will be discussed in connection with the description of the phase-locked loop system hereinbelow.

Figure 3A:
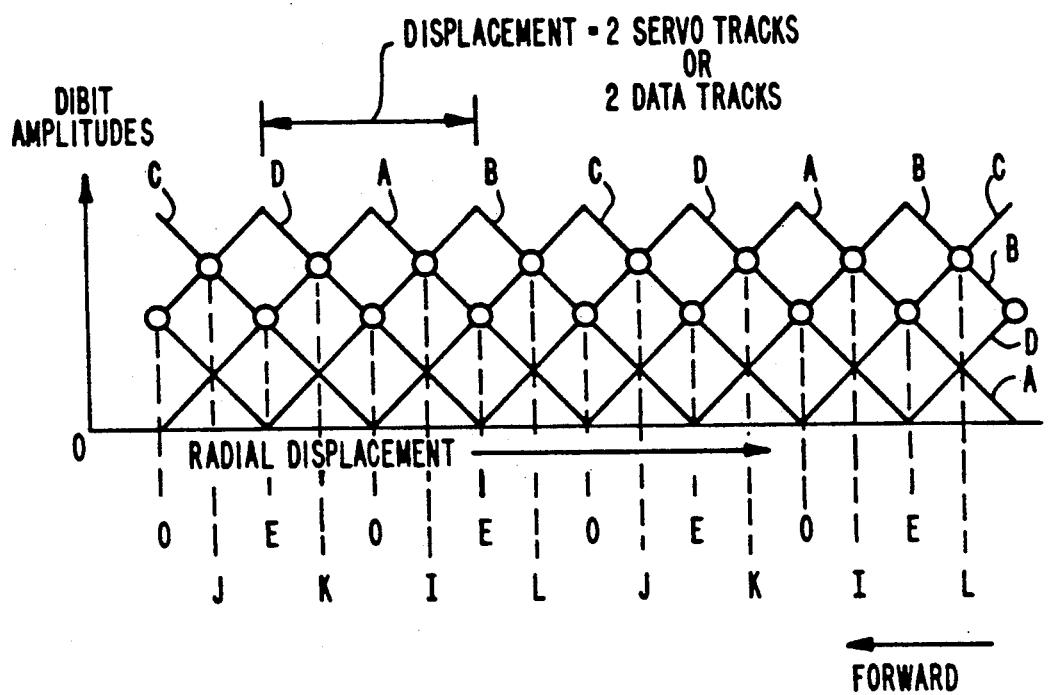

FIG. 3A illustrates the variations in the amplitude of a dedicated servo dibit signals as a function of the radial displacement of the servo head 27. In this connection it is assumed that in FIG. 2A the amplitude of a dibit signal generated by the head 27 is essentially proportional to the portion of the width of head 27 that traverses the dibit. Thus, in the illustrated position of the head 27, the A dibits will generate a signal of full amplitude, whereas B and D dibits will generate half-amplitude, signals and the signal generated by the C dibits will have zero amplitude. Moreover, when the head is centered on even-numbered track centerlines such as centerlines 78 and 80, the A and C dibit signals are both of half amplitude and, thus, equal. Conversely, when the head 27 is centered on odd-numbered track centerlines, the B and D dibit signals are half amplitude and thus equal.

Returning to FIG. 3A, it will thus be apparent that the even-numbered servo track centerline positions of the servo head 27 are a designated as E, while the odd numbered track positions are designated as 0. These positions are determined by subtracting the A and C signals, and also the B and D signals, to ascertain the equalities of the respective amplitudes. Subtraction also provides further track information as will now be described.

With reference to FIG. 3B, the track identification unit 68 makes use of the (A−C), (B−D), (D−B), and (C−A) signals from the dedicated servo demodulator 40 (FIG. 1). The (A−C) and (B−D) signals have zero values corresponding to centerline positions on even- and odd-numbered tracks as described above. Additionally, the unit 68 is arranged to provide an unambiguous indication of head position within four consecutive tracks which, for convenience, are numbered as indicated at the bottom of FIG. 3B.

Furthermore, as will be understood from FIG. 3C, comparison of the values (B+C) and (A+D) and further comparison of the values of (C+D) and (A+B) provide a Gray code representation of these track numbers. As indicated in FIG. 3C, the transitions in the two Gray code signals are characterized by a degree of uncertainty in that when two compared quantities are approximately equal, noise can result in a jitter of the comparison signal, i.e., cause it to shift back and forth between one logic level and the other. The track identification system eliminates the effect of this jitter, thus preventing it from adversely affecting operation of circuits which depend on continuous progression of the track identification signals in the proper order.

Figure 4:
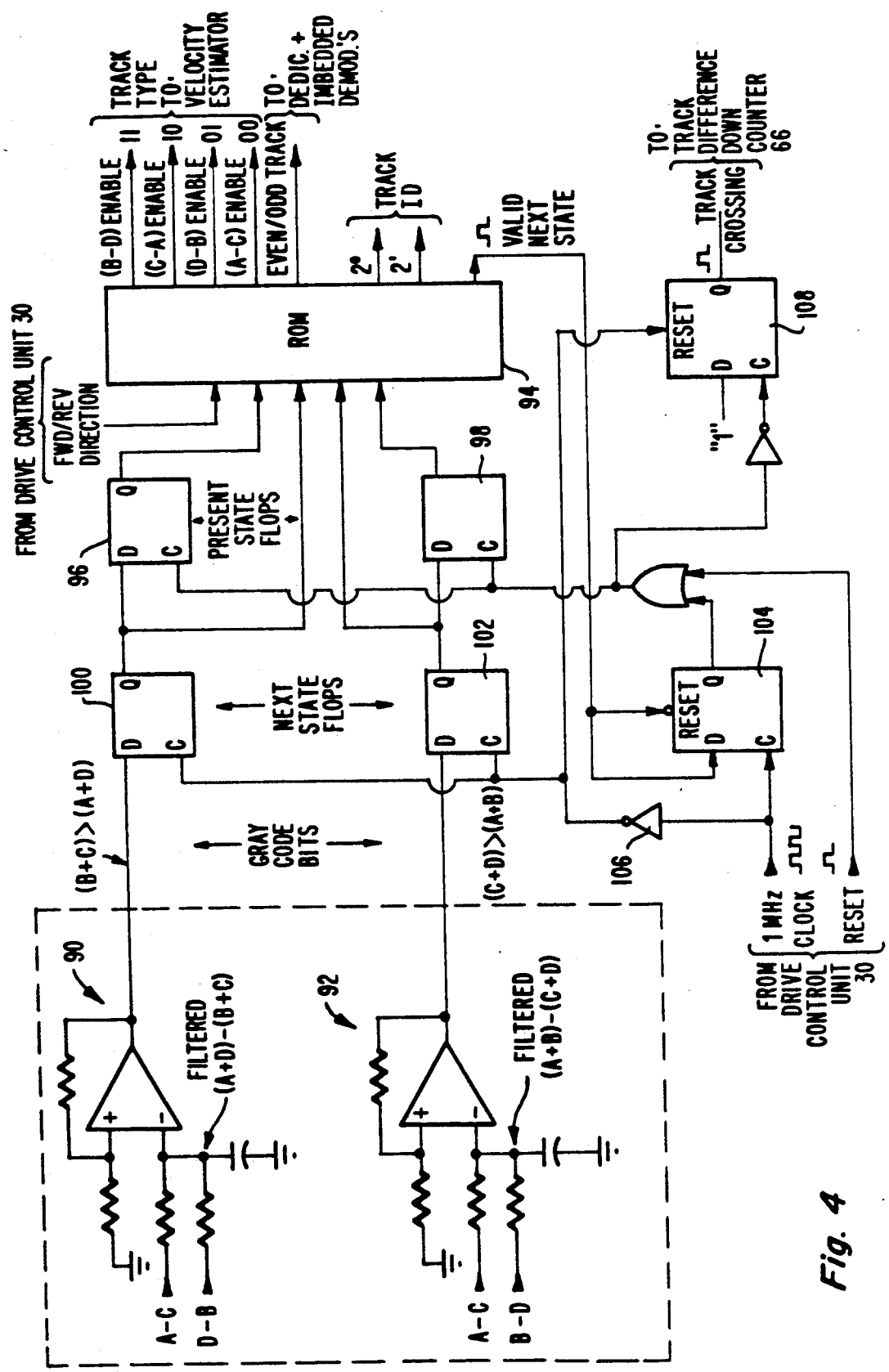
FIG. 4 is a schematic diagram of the track identification unit of FIG. 1B.

Turning now to FIG. 4, the track identification unit 68 includes a comparator 90 having an input terminal at which the (A−C) and (D−B) voltages are summed. The comparator 90 thus compares the voltages (A+D) and (B+C) and provides an assertion level output when (B+C) exceeds (A+D). Similarly, a comparator 92 receives the (A−C) and (B−D) voltages and provides an assertion level output when (C+D) exceeds (A+B). Thus the outputs of the comparators 90 and 92 correspond to the two Gray code bits of FIG. 3C, whose transitions correspond in turn to the crossings of the data track boundaries. These outputs are applied to a finite state machine governed by the table in FIG. 5. This table in turn represents successive values in the Gray code position representation of FIG. 3C.

Specifically, the unit 68 includes a decoder 94, whose input is the combination of (1) the outputs of a pair of flip-input flops 96 and 98 representing the Gray code representation of the present track position of the data heads, (2) the outputs of a pair of flip-flops 100 and 102 containing successive samples of the outputs of the comparators 90 and 92, and (3) a fifth bit representing the direction of head movement, i.e., forwarded or reverse, as indicated by a signal from a drive control unit 30. The circuit is clocked by a high frequency squarewave provided by the control unit 30.

Assume that initially a valid next state signal from the decoder 94 is not asserted and that a flip-flop 104 is in the reset condition. Successive negative transitions of the clock signals, as passed by an inverter 106, cause the flip-flops 100 and 102 to continually sample the outputs of the comparators 90 and 92. As long as the flip-flops do not contain the next valid Gray code representation of the head position, the decoder 94 will continue to negate the valid next state signal and the unit 68 will essentially idle. When the comparator outputs ultimately correspond to the Gray code representation of the next data track in the sequence, the five-bit address applied to the decoder 94 causes the memory to emit a valid next state signal. This signal conditions the flip-flop 104 to be set by the succeeding positive-going transition of the clock signal. In turn the change of state of the flip-flop 104 clocks the states of the flip-flops 100 and 102 into the flip-flops 96 and 98. With the new Gray code state contained in flip-flops 96 and 98, the flip-flops 100 and 102 no longer contain the bits for the next state and the decoder 94 therefore negates the valid next state signal, thereby immediately resetting the flip-flop 104.

The foregoing sequence is repeated each time the outputs of the comparators 90 and 92 correspond to the Gray code representation of the next track in the sequence represented by FIG. 3B. On the other hand, assume that after a transition to a new Gray code state, with transfer of the new state to the flip-flops 96 and 98, the output of the comparator 90 or 92 whose transition resulted in the change of state reverses its state in response to noise. This will not cause a change of state of the flip-flops 96 and 98, since the false change of state indicated to the flip-flops 100 and 102 will not be recognized as a valid next state by the decoder 94. Thus, the circuit of FIG. 4 provides an orderly progression of states representing continuous movement of the selected data head from one track to the next during a seek operation.

The decoder 94 transmits to the control unit 30 (FIG. 1B) a binary track identification derived from the states of the "present state" flip-flops 96 and 98. The decoder 94 also provides a set of track-type signals used by the velocity estimator 58 (FIG. 1). These signals correspond to the track identification numbers as indicated. The memory 94 also provides a one-bit signal indicating whether the present track is an even or odd track. The track-type signals and the even/odd signal are derived from the states of the flip-flops 100 and 102. The signals are thus subject to variation because of jitter as discussed above. However, in the circuits that use them, the instantaneous values are important, not the information contained in the flip-flops 96 and 98.

With further reference to FIG. 4, a flip-flop 108, which responds to the resetting of the flip-flop 104, provides a single pulse to the track difference counter 66 of FIG. 1, corresponding to each crossing of a track boundary.

FIG. 8 is a diagram of the dedicated servo demodulator 40 of FIG. 1B. The servo signals from the dedicated servo surface arrive at the demodulator 40 in differential form on a pair of conductors 110 and 112, which apply these signals to a controlled gain amplifier 114 described below in detail. The output of the amplifier 114 is passed through a low pass filter 116 and a buffer amplifier 118 to a set of peak detectors 120, one for each of the A, B, C, and D servo signals (FIG. 2A). These signals arrive at the demodulator in a fixed time sequence and they are gated into the corresponding peak detectors 120 by signals from the phase-locked loop unit 70. The outputs of the peak detectors 120 in turn are applied to a set of differencing amplifiers 122 which provide the depicted difference signals (A−C), etc.

Since the instantaneous values of the output signals of the demodulator 40 are used by other circuits in the system, these signals must be immunized against variations in the underlying A, B, C, and D servo voltages resulting from such factors as anomalies in the magnetic medium on the dedicated servo surface. With such effects eliminated, the voltages will then be truly representative of he radial position of the servo head 27 (FIG. 2A). The demodulator 40 incorporates an automatic gain control circuit to accomplish this function.

At the outset one should bear in mind that no one of the A, B, C, and D voltages can be used as a feedback signal for gain control, since these signals vary with head position. However, from inspection of FIGS. 2A and 3A, it will be seen that when the position of the servo head 27 corresponds to an odd data track, whose centerline might correspond, for example, to the centerline of the servo track, the sum of the A and C signals will be independent of the radial position of the head on that track. Similarly, when the head 27 position corresponds to even data track, whose centerline might correspond, for example, to the servo track boundary 84 in FIG. 2A, the sum of the B and D voltages will be independent of the radial position of the head on that track.

Accordingly, as shown in FIG. 8, the A, B, C, and D voltages from the peak detectors 120 are applied to a set of summing circuits 124 which provide (A+C) and (B+D) voltages to an AGC basis selector 126. In the selector 126 these signals pass through a switch 128 and a switch 130. The switch 130 may be considered to be closed for the purposes of this description, with the switch 128 being switched between the even and odd positions by the even/odd signal from the track identification unit 68.

Thus the appropriate gain control signal is fed back depending on whether the position of the servo head corresponds to an odd or even data track. This signal is then applied to a summer 132 for comparison with an AGC reference voltage and the resulting error voltage is integrated by an integrator 134. The output of the integrator 134 in turn is applied to a feedback function generator 136 that supplies the control current to the controlled amplifier 114.

In order to provide the desired degree of immunity from variations in signal strength, the automatic gain control circuit must have a high loop gain. For stability of operations, this required a large loop bandwidth which is constant over the variations in the strength of the incoming servo signals.

I have found that the requisite bandwidth characteristic can be obtained applying an inverse exponential relationship between the gain of the controlled amplifier 114 and the AGC feedback voltage that controls that gain. Specifically, the relationship between the gain K of the amplifier and the feedback voltage, V, should have the form $$K = C_1 e^{-C_2 V}$$

where C1 and C2 are constants. In FIG. 8 this relationship is provided by the function generator 136.

Figure 9:
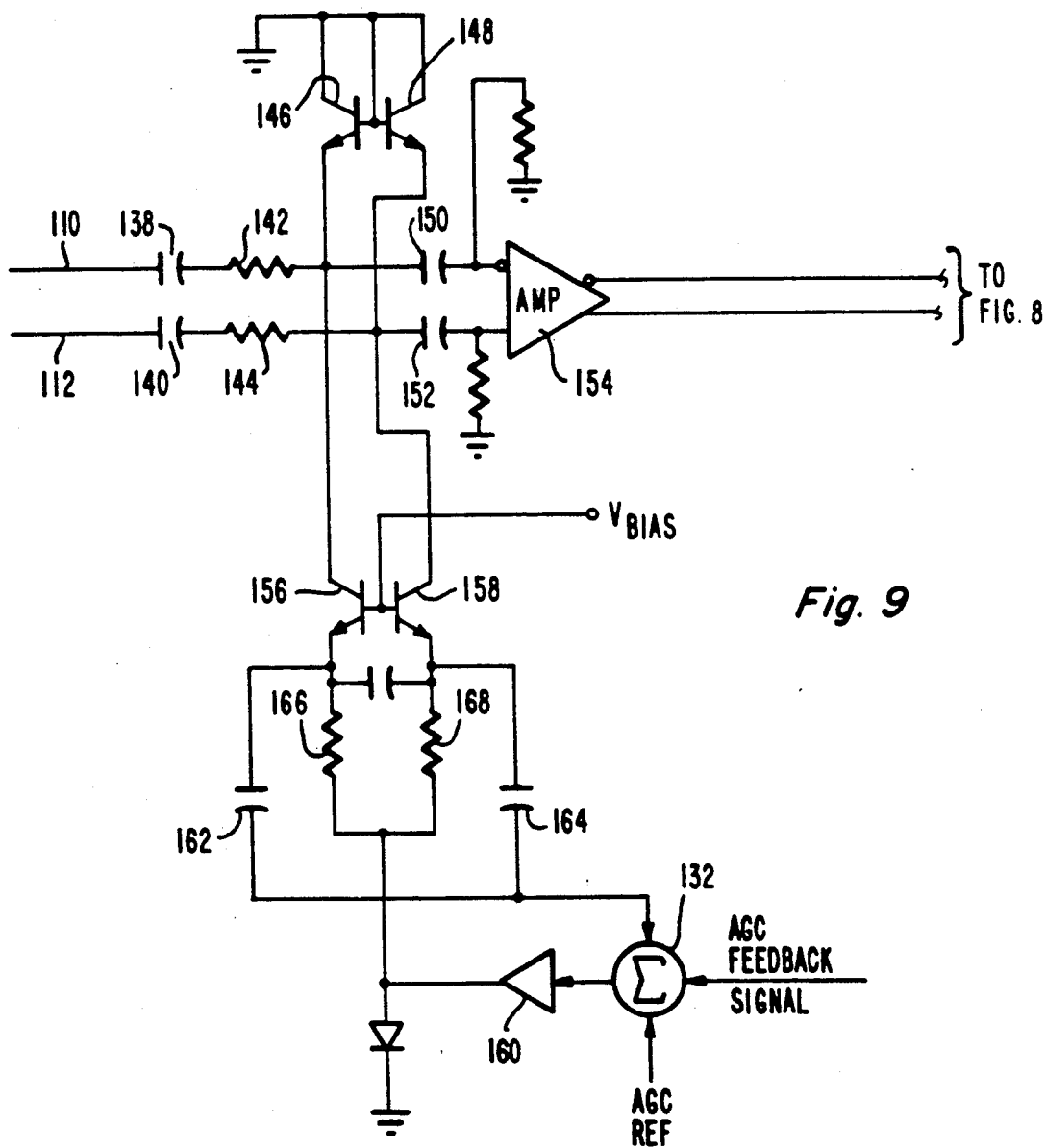
FIG. 9 is a circuit diagram of a portion of the automatic gain control circuit used in the demodulator of FIG. 8.

FIG. 9 discloses in detail a circuit incorporating the gain controlled amplifier 114, the integrator 134 and the function generator 136. The differential input signals on conductors 110 and 112 are passed through blocking capacitors 138 and 140 to voltage dividers comprising series resistors 142 and 144 and shunt resistances provided by diodes 146 and 148 in the form of appropriately connected transistors. From the voltage dividers the signals pass through a second set of blocking capacitors 150 and 152 to a difference amplifier 154 whose output is the output of the gain controlled amplifier 114 of FIG. 8. The diodes 146 and 148 are provided with bias currents by a pair of transistors 156 and 158, each of whose input is the integrated feedback error signal which is applied as the base-emitter voltage of the transistor.

With further reference to FIG. 9, integration of the gain control error signal from by the summer 132 is provided by an amplifier 160 having a feedback circuit comprising the parallel combination of integration capacitors 162 and 164 and resistors 166 and 168. The resistors 166 and 168 are current-limiting and do not otherwise affect the operation of the circuit. The feedback provided by the capacitors 162 and 164 to the summing circuit 132 provides the requisite integration at the output of the amplifier 160, this output being applied to the emitters of the transistors 156 and 158.

The circuit of FIG. 9 accomplishes the desired exponential gain-error voltage relationship as follows. The collector currents of the transistors 156 and 158 are exponentially related to the base-emitter voltages of the transistors and are thus exponentially related to the gain-control error voltage provided by the integrator 134. These collector currents pass through the diodes 146 and 148, respectively. The diodes in turn have dynamic resistances which are inversely proportional to the currents through them. The dynamic resistances of the diodes are much less than the resistances of the resistors 142 and 144. The voltages applied to the amplifier 154 are therefore essentially proportional to the diode resistance and thus inversely proportional to the collector currents of the transistors 156 and 158. The circuit thus provides the following two relationships:

$$I = C_3 e^{C_4 V}$$

where I is the transistor collector current, and $$K = C_5 / I$$

where K is the gain of he voltage divider provided by the resistors 142 and 144 and diodes 146 and 148. The foregoing formulas can be combined to provide $$K = C_1 e^{-C_2 V}$$

the desired relationship provided by the feedback function generator 136 of FIG. 8.

Figure 10:
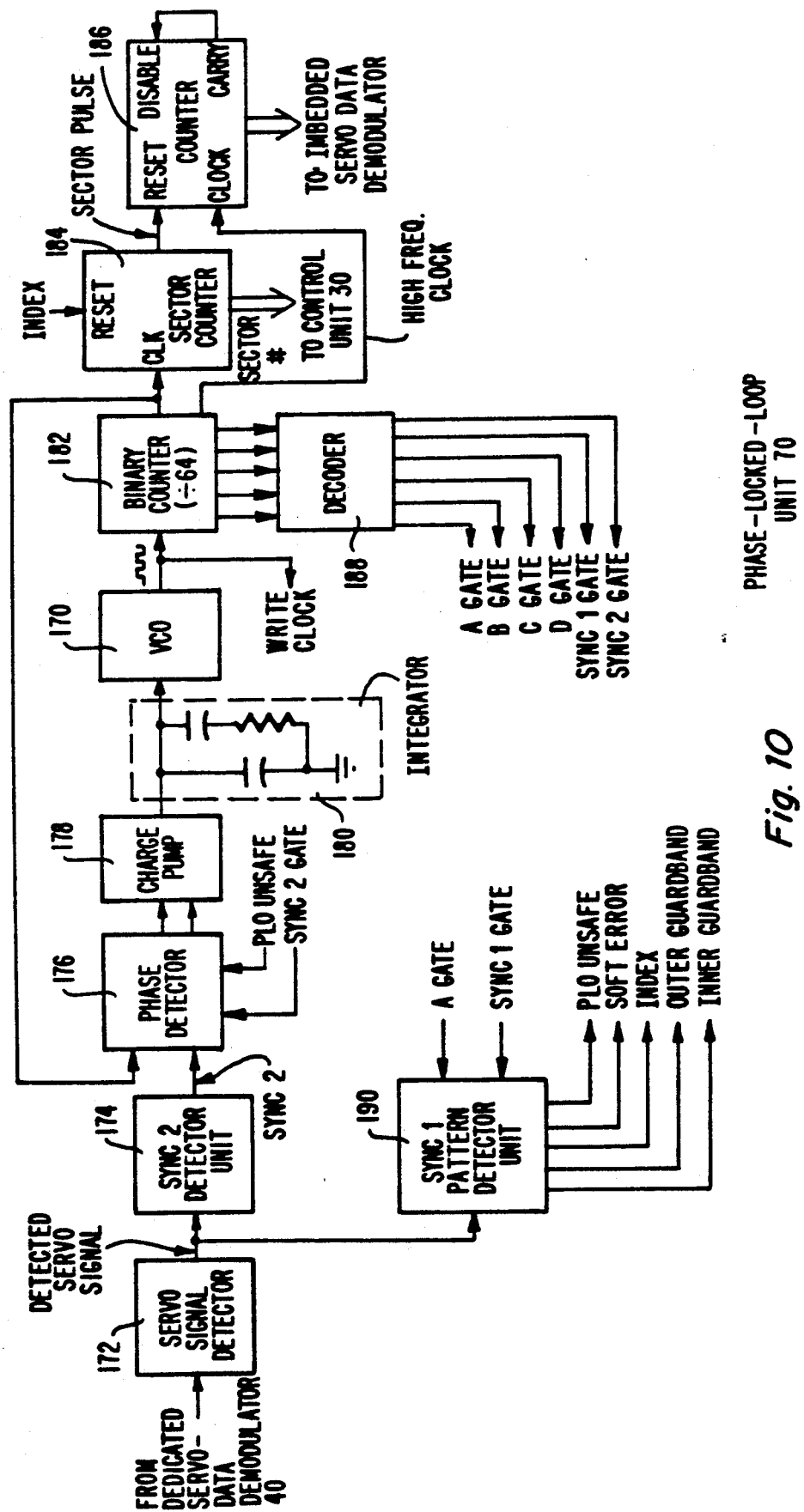
FIG. 10 is a diagram of the phase-locked loop unit of FIG. 1B.

The phase-locked loop unit 70 is broadly illustrated in FIG. 10. Basically the unit locks a voltage-controlled oscillator 170 to the S2 synchronizing signals included in every frame on the dedicated servo surface (FIG. 2A). Input signals from the dedicated servo-data demodulator 40 (FIGS. 1 and 8) are applied to a servo signal detector 172, whose output is applied to a SYNC 2 detector unit 174. The detected SYNC 2 signal in turn is used as one input of a phase detector 176 in the phase-lock loop of the oscillator 170. The phase error output of the detector 176 is fed to a charge pump 178 whose output is integrated by an integrator 180, the output of the integrator 180 being the control voltage for the oscillator 170. The output of the oscillator 170 is divided in frequency by a counter 182 which, every time it cycles, applies a "frame" pulse to the phase detector 176. In the illustrated system the counter 182 divides the frequency of the oscillator 170 by a factor of 64, and thus the oscillator 170 has a frequency 64 times that of the SYNC 2 pulses. The oscillator output is also used as a write clock signal for the read/write circuits 34 (FIG. 1).

Continuing in FIG. 10, the frame pulses from the counter 182 are counted by a sector counter 184. The counter 184 provides a sector pulse each time it counts a number of frame pulses equal to the length of a sector on a data disk. Further, it counts the sector pulses. The counter is reset by an index pulse, developed as described below, each time the disk assembly rotates past the index position. Thus, sector pulse count, which is passed to the control unit 30 (FIG. 1) is the sector-identifying number. The sector pulses are also used to reset a counter 186 which serves as a timer for the embedded servo data as described below. When the counter 186 is reset, which occurs at the beginning of each data sector, it begins counting high frequency pulses from the counter 182 and continues until the counter reaches its maximum count, sixteen in the illustrated example, at which time it disables itself and thus stops counting until the next sector pulse is received. As will be seen, the frequency of the pulses counted by the counter 186 is such that the interval during which the counter counts spans the embedded servo field in each sector of the data track one of the data surfaces.

The contents of the binary counter 182 are applied to a decoder 188, which provides the A, B, C, and D gate signals used by the dedicated servo demodulator 40 of FIG. 8 as described above. The decoder 188 also provides SYNC 1 and SYNC 2 gate signals. The outputs of the decoder 188 are derived from counts in the counter 182 that occur at the appropriate times for these various gating signals.

The phase-locked loop unit 70 of FIG. 10 also includes a SYNC 1 pattern detector unit 190 which derives its input from the servo signal detector 172. The pattern detector 190 provides the index pulse discussed above, as well as the signals indicating that the servo head 27 is positioned over an outer guard band or an inner guard band. It also provides signals indicating soft errors as discussed below and an unsafe condition of the phase-locked loop, also discussed below.

Figure 11:
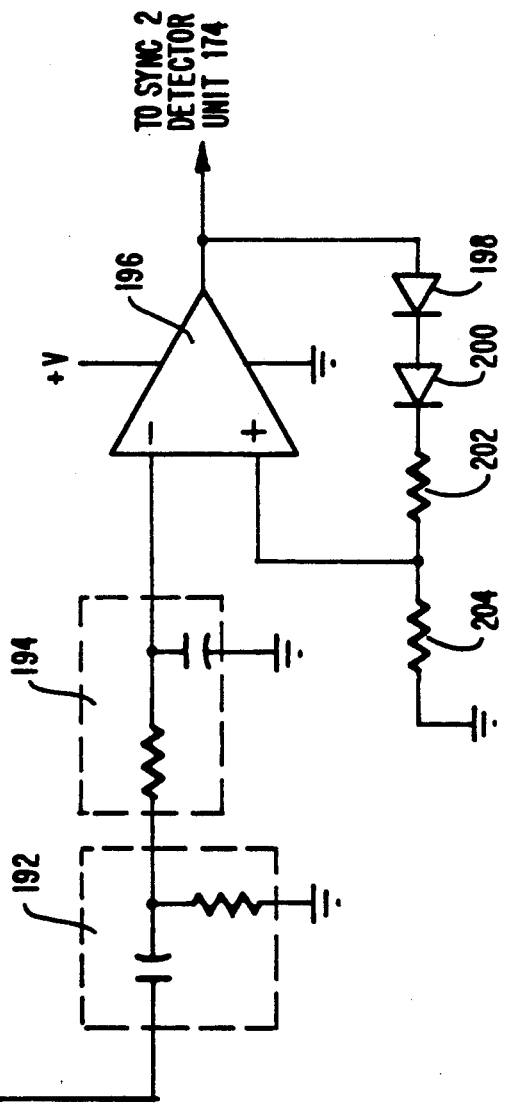
FIG. 11 is a circuit diagram of the servo signal detector used in the phase-locked loop unit.

The servo signal detector 172 is illustrated in FIG. 11. The input signals from the demodulator 40 (FIGS. 1 and 8) pass through an AC coupler 192 which removes any DC bias from these signals, and then through a low pass filter 194 to the inverting input terminal of an amplifier 196. The output of the amplifier 196 is fed back to the non-inverting input terminal of the amplifier by way of a pair of diodes 198 and 200 and a voltage divider comprising resistors 202 and 204. The output of the comparator switches between a relatively high positive voltage and a very small positive voltage in response to negative voltages, respectively, from the low pass filter 194.

The detector 174 operates to detect the negative-going zero crossing between the two pulses in each of the servo dibits. As described above, each of these dibits provides a positive pulse followed by a negative pulse. The two transitions of each dibit are spaced close enough together so that the two pulses overlap to provide, in essence, a continuous transition from a positive peak to a succeeding negative peak. The point at which this transition crosses the zero axis is well defined as compared with other parts of the dibit and is quite insensitive to variations in overall dibit amplitude. The detector 174 operates to detect these transitions.

The positive-going transitions in the output of the amplifier 196 correspond to these transitions within the servo dibit signals and it is these transitions to which the SYNC 2 detector 174 and SYNC 1 pattern detector 190 respond. The diodes 198 and 200 become non-conducting and therefore offset the slight positive voltage from the output of the comparator 196 at its positive input when it is at the non-asserted level and thus assure that, with the feedback, the positive-going comparator transitions occur at zero input voltage.

Figure 12:
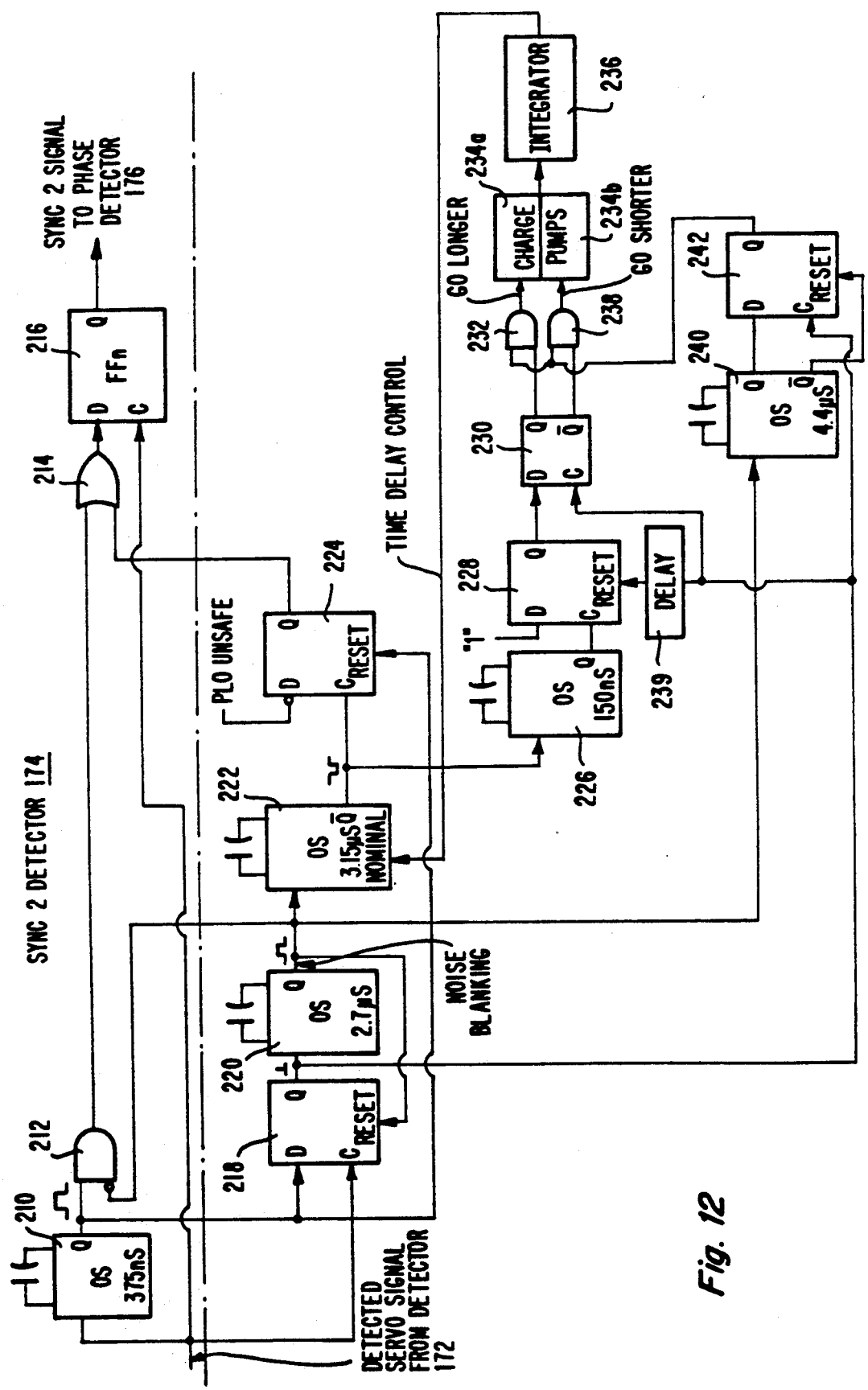
FIG. 12 is a circuit diagram of a SYNC signal detector used in the phase-locked loop unit.

FIG. 12 depicts the circuit of the SYNC 2 detector 174 of FIG. 10. At the outset, certain characteristics of the dedicated servo signals should be kept in mind. First, most frames contain both the S1 and S2 dibits. Secondly, the S1 dibit is never absent from two or more consecutive frames. Furthermore, in frames containing both S1 and S2 dibits, these two dibits are substantially more closely spaced than are any other pair of dibits. Finally, in accordance with the operation of the servo signal detector 172 just described, the detection of a dibit is represented by a rising transition of the output of that detector. Similarly, in the output of the SYNC 2 detector 174, rising transitions represent the occurrence of the S2 dibits. The triggered and clocked circuit elements in the illustrated circuits respond to the rising transitions of the signals applied to them. Such transitions in the output of the detector 172 are referred to as "signals".

Each SYNC signal received from the servo signal detector 172 is applied to a retriggerable one-shot 210 whose output is passed by a gate 212 and an OR circuit 214 to enable a flip-flop 216. The one-shot 210 asserts its output for an interval slightly longer than the interval between an S1 dibit and the succeeding S2 dibit, e.g., 375ns. Thus, if the signal that triggered the one-shot 210 was an S1 signal, the following S2 pulse, serving as a clock input for the flip-flop 216 will cause the flip-flop to set, thereby presenting a SYNC 2 signal at its output terminal. The one-shot 210 will then time out before the next servo signal, which will be derived from a positioning dibit (FIG. 2B), thereby disabling the flip-flop 216. The next signal will thus reset the flip-flop, thereby deasserting its output.

If a frame contains no S1 dibit, the S2 signal will arrive with the flip-flop 216 disabled and will therefore not provide a SYNC 2 output from the flip-flop. To recapitulate, the one-shot 210 and associated circuitry provide SYNC 2 output signals during servo frames in which both the S1 and S2 dibits are present. When the S1 dibit is absent, the circuitry in the lower part of the detector 174 enables the flip-flop 216 to provide the SYNC 2 output.

More specifically, in frames containing both the S1 and S2 dibits, the output of the one-shot 210, in response to the S1 signal from detector 172, enables a flip-flop 218 to be set by the succeeding S2 signal. The output of the flip-flop 218 in turn triggers a one-shot 220 which immediately resets the flip-flop 218, the output of the latter flip-flop thus being a narrow pulse as depicted. The one-shot 220 asserts its output for an interval somewhat less than the interval to the next possible S1 pulse. This signal inhibits the gate 212 and thus provides a measure of noise immunity by preventing the one-shot 210 from enabling the flip-flop 216 until the time slot for the S1 signal in the next frame.

The leading edge of the output of the one-shot 220 triggers a voltage-controlled, variable one-shot 222 which times out after an interval that nominally terminates, in the next servo frame, 150 ns before the arrival of the next S2 signal. At the end of this interval, the rising edge of the output of the one-shot 222 clocks a flip-flop 224. If an S1 signal occurs in the new frame before the S2 signal, the resulting output of the one-shot 210 will hold the flip-flop 224 in the reset state. However, if there is no S1 signal in this frame, the one-shot 210 will not have asserted its output at this time. The clocking of the flip-flop 224 by the output of the one-shot 222 will therefore set the flip-flop 224, thereby enabling the flip-flop 216 by Way of the OR circuit 214. The arrival of the S2 signal in that frame will then set the flip-flop 216, with a resulting SYNC 2 output as described above. The flip-flop 224 will then be reset by the one-shot 210 upon the receipt of the next servo pulse from the servo signal detector 172.

With further reference to FIG. 12, the SYNC 2 detector 174 also includes a phase-locked loop that controls the timing interval of the one-shot 222. The rising edge of the output of the one-shot 222 triggers a one-shot 226 having a timing interval of 150 ns. On termination of this interval, the output of the one-shot clocks an enabled flip-flop 228 and thereby sets the flip-flop. The resulting output of the flip-flop 228 enables a flip-flop 230. The flip-flop 230 is clocked by the next pulse from the flip-flop 218.

Assume first that the interval of the one-shot 222 is slightly shorter than the nominal value, so that it times out somewhat before the 150 ns interval preceding the S2 signal. The flip-flop 226 will then time out shortly before the S2 signal so that when the latter signal arrives, the resulting clocking of the flip-flop 230 will occur after the flip-flop has been enabled, thereby setting the flip-flop. The resulting output of the flip-flop 230 will be passed by a gate 232 to a charge pump 234a which, for example, applies a positive charge to an integrator 236 whose output voltage controls the timing interval of the one-shot 222. The integrator output will change in a direction to increase the timing interval of the one-shot 222. The interval will then be slightly longer than the nominal value. The resulting delay in the triggering of the one-shot 226 will delay the setting of the flip-flop 228 and the enabling of the flip-flop 230 until after the arrival of the next S2 signal.

The pulse from the flip-flop 218 corresponding to the S2 signal will therefore arrive with the flip-flop 230 disabled, thereby resetting the flip-flop. The resulting output of the flip-flop 230 will be passed by a gate 238 to a charge pump 234b which applies a negative charge to the integrator 236. The integrator output will thus change in the direction that shortens the timing interval of the one-shot 222. Thus the timing of the one-shot 222 is "dithered" back and forth in a small interval encompassing a time corresponding to the interval of the one-shot 256 (150 ns) prior to the occurrence of each S2 pulse.

The flip-flop 228 is reset by the output pulses from the flip-flop 218 shortly after clocking of the flip-flop 230, as indicated by the delay element 239. This readies the flip-flop 228 for setting by the output of one-shot 226 in each cycle of the phase-locked loop.

The above-described operation of the phase-locked loop in the SYNC 2 detector 174 requires the receipt of a series of S1, S2 signal pairs. Specifically, if an S1 signal is absent in a frame, there will be no pulse from the flip-flop 218 to clock the flip-flop 230. The latter flip-flop may therefore remain too long in one state, thereby unduly changing the timing interval of the one-shot 222. I therefore employ a signal pair detector that disables the gates 232 and 238 in those situations.

Specifically, the output of the one-shot 220, in response to receipt of an S1, S2 signal pair, triggers a retriggerable one-shot 240 whose timing interval is slightly longer than one frame. If then a second S1, S2 signal pair is received in the next frame, the output of the flip-flop 218 will clock a flip-flop 242 that is enabled by the one-shot 240, thereby setting the flip-flop 242 and enabling the gates 232 and 238 to permit operation of the phase-locked loop. If the second S1, S2 signal pair is not received, the one-shot 240 to time out, thereby disabling the flip-flop 242. Upon receipt of an S1, S2 pulse pair in the next frame, a clocking pulse from the flip-flop 218 will arrive at the flip-flop 242 slightly before the triggering of the one-shot 240 by the output of the one-shot 220. The flip-flop 242 will therefore remain disabled.

Finally, if consecutive S1, S2 signal pairs have arrived, with a resulting enabling of the gates 232 and 238 by the output of the flip-flop 242, a subsequent omission of an S1 signal will permit the one-shot 240 will time out, thereby resetting the flip-flop 242 and shutting down the phase-locked loop. Accordingly, the phase-locked loop operates only after an S1,S2 signal pair that follows an S1,S2 signal pair in the immediately preceding frame.

The above-described operation of the SYNC 2 detector is especially important in guard band areas, where a significant percentage of SYNC 1 signals will be missing.

Figure 13:
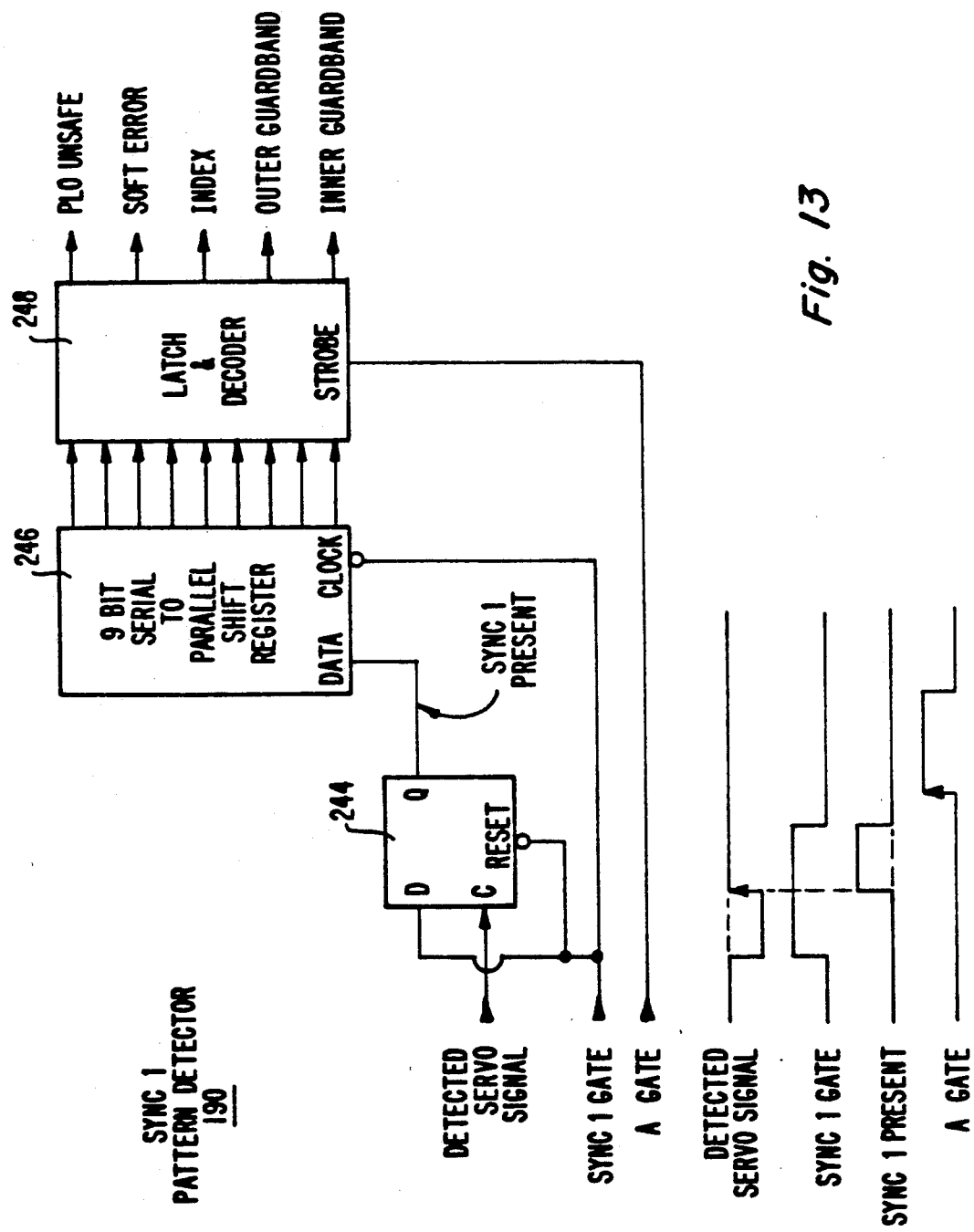
FIG. 13 is a diagram of a synchronization pattern detector used in the phase-locked loop unit.

FIG. 13 depicts the SYNC 1 pattern detector 190. It includes a flip-flop 244 which is enabled by the SYNC 1 gate signals generated by the decoder 188 in FIG. 10. These gate signals occur during an interval encompassing the time of arrival of an S1 signal if that signal is present in a servo frame. The flip-flop 244 is clocked by the detected servo signals from the detector 172 of FIG. 11. The flip-flop is thus set each time an S1 signal is received.

The output of the flip-flop 244 is applied to a shift register 246 which is clocked by the trailing edge of the SYNC 1 gate signal. Thus, the shift register 246 contains a running pattern of bits representing the presence or absence of the S1 dibit in successive frames in the servo surface depicted in FIG. 2A. The contents of the shift register 246 are applied parallel to a latch and decoder 248. The latch and decoder 248 latches in the contents of the shift register 246 in response to the A gate signal, thus being the first signal in each frame generated by the decoder 188 of FIG. 10 following the receipt of the S2 signal.

The latch and decoder 248 provides an output signal if the bit pattern contained therein indicates any of the conditions indicated in FIG. 13. The generation of the index, outer guard band and inner guard band signals have been discussed above. The soft error signal is asserted if the bit pattern has a one-bit error. The soft error signal is asserted if the bit pattern has a one-bit error. The PLO UNSAFE signal is asserted if the bit pattern has an error in two or more bits. This signal is an indication of the possible unreliability of the outputs of the phase-locked loop unit 70.

In FIG. 2B I have illustrated the format of the embedded servo information in data tracks on one of the data surfaces in the disk assembly 10. A series of data tracks are denoted by their centerlines 250, 251, etc. Each track contains a series of sectors, each of which includes a servo field 254 followed by a data field 256. The servo fields 254 contain two sets of servo signal blocks, designated "X" and "Y". Each block is centered on a track boundary (not shown), has a width of one track, and thus spans the distance between the two adjacent track centerlines. The X blocks are centered on alternate track boundaries and the Y blocks are centered on alternate boundaries staggered with respect to the blocks X. Thus, as the disk rotates under a read/write head 262 positioned over the track centerline 251, a portion of an X servo block will pass under the head followed by a portion of a Y servo block. The system determines the radial position of the head 262 with respect to the centerline 251 by ascertaining the relative proportions of the widths of the X and Y blocks passing under the head.

More specifically, each X or Y servo block contains a magnetically recorded high frequency burst. The amplitude of the burst received from the X block by the head 262 is compared with the amplitude received by the succeeding Y block. Equality of the two indicates that the head is centered on the centerline 251; if they are unequal, the magnitude of the difference of the detected amplitudes is a measure of the off-center distance of the head 262.

It should be noted that when the head 262 is positioned over an odd numbered track, such as the track 251, the X servo blocks are radially outer blocks with respect to the track centerline and the Y blocks are radially inner blocks. Conversely, when the head 262 is positioned over an even numbered track, the Y blocks are outer blocks and the X blocks are inner blocks. This causes the sense of the position error signal derived from the X and Y blocks to depend on whether the track is even-numbered or odd-numbered, a factor that is taken into account in the operation of the embedded servo detector 36.

It will be apparent that the X and Y servo blocks in FIG. 2B need not be positioned in the circumferential direction with a high degree of accuracy. They should be spaced apart circumferentially by a distance greater than the width of the magnetic gap in the head 262 so that the head will not receive energy from an X block simultaneously with the receipt of energy from a Y block. Also, there should be deadbands before the X blocks and after the Y blocks, so that the head 262 will not receive any other signals when it is receiving X block or Y block signals. Other than that, the circumferential positioning of these servo blocks is subject to a relatively wide tolerance, depending on the constraints imposed by the timing signals used in detecting the servo information.

A resulting important feature of this arrangement is the ability to use the disk drive itself in recording the embedded servo signals. A highly accurate servo recording system need be used only to record the signals on the dedicated servo surface. The signals retrieved from that surface may then be used by the illustrated drive itself in recording the embedded servo information on the other data surfaces.

FIG. 6 is a diagram of the detector 36, which detects the embedded servo signals and develops the embedded position error signal in response thereto. The various timing signals used in FIG. 6 are generated by a decoder 262 whose input is the content of the counter 186 of FIG. 10. The timing of these signals and the signals processed by the demodulator 36 are depicted in FIG. 7.

With reference to FIG. 6, the input to the demodulator 36, from the head selection and amplifier unit 32, passes through a summer 264 to an input amplifier 266. The output of the amplifier 266 is passed through an L-C tank circuit 268 whose resonant frequency equals the frequency within the signal burst contained in each of the X and Y servo data blocks (FIG. 2B). The tank circuit 268 is keyed on and off by a reset L-C tank signal from the decoder 262, this signal effectively short-circuiting the tank circuit at times other than the times of arrival of the X and Y bursts, as indicated in FIG. 7. The form of the output of the tank circuit 268 is also depicted in FIG. 7.

The output of the tank circuit 268 passes through an amplifier 270 to a full wave rectifier 272 whose output is filtered by a low pass filter 274. The filtered signal then passes through a switch 276 and a resetable integrator 278, a typical integrator output being depicted in FIG. 7. From the integrator 278, the signals pass through a buffer 280 to a pair of sample-and-hold circuits 282 and 284. If the servo burst contained in the integrator 278 is from an outer block, it is sampled and held in the circuit 282. If it is from an inner block, it is held in the circuit 284. Thus, at the end of each embedded servo field, the sample and hold circuits 282 and 284 contain updated voltages corresponding to the sensed amplitudes in the outer and inner servo blocks in the data track on which the selected data head is positioned.

The contents of the sample-and-hold circuits are passed through buffer amplifiers 286 and 288 to an automatic gain control circuit generally indicated at 290. After gain correction by the circuit 290, they are subtracted in a differencing amplifier 292 whose output is the embedded track error signal.

Figure 6A:
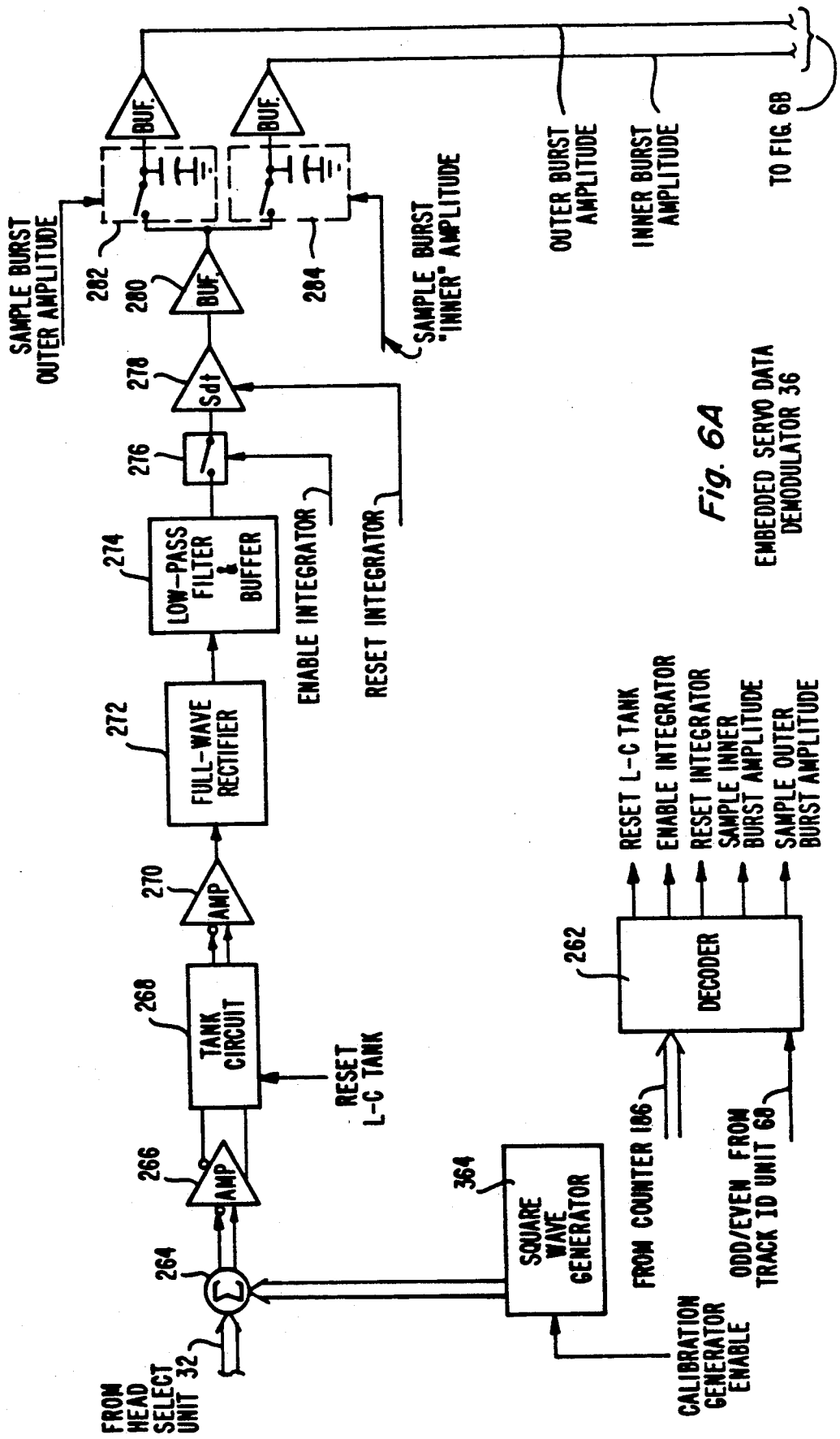
FIGS. 6A and 6B contain a circuit diagram of the embedded servo data demodulator of FIG. 1B.
Figure 6B:
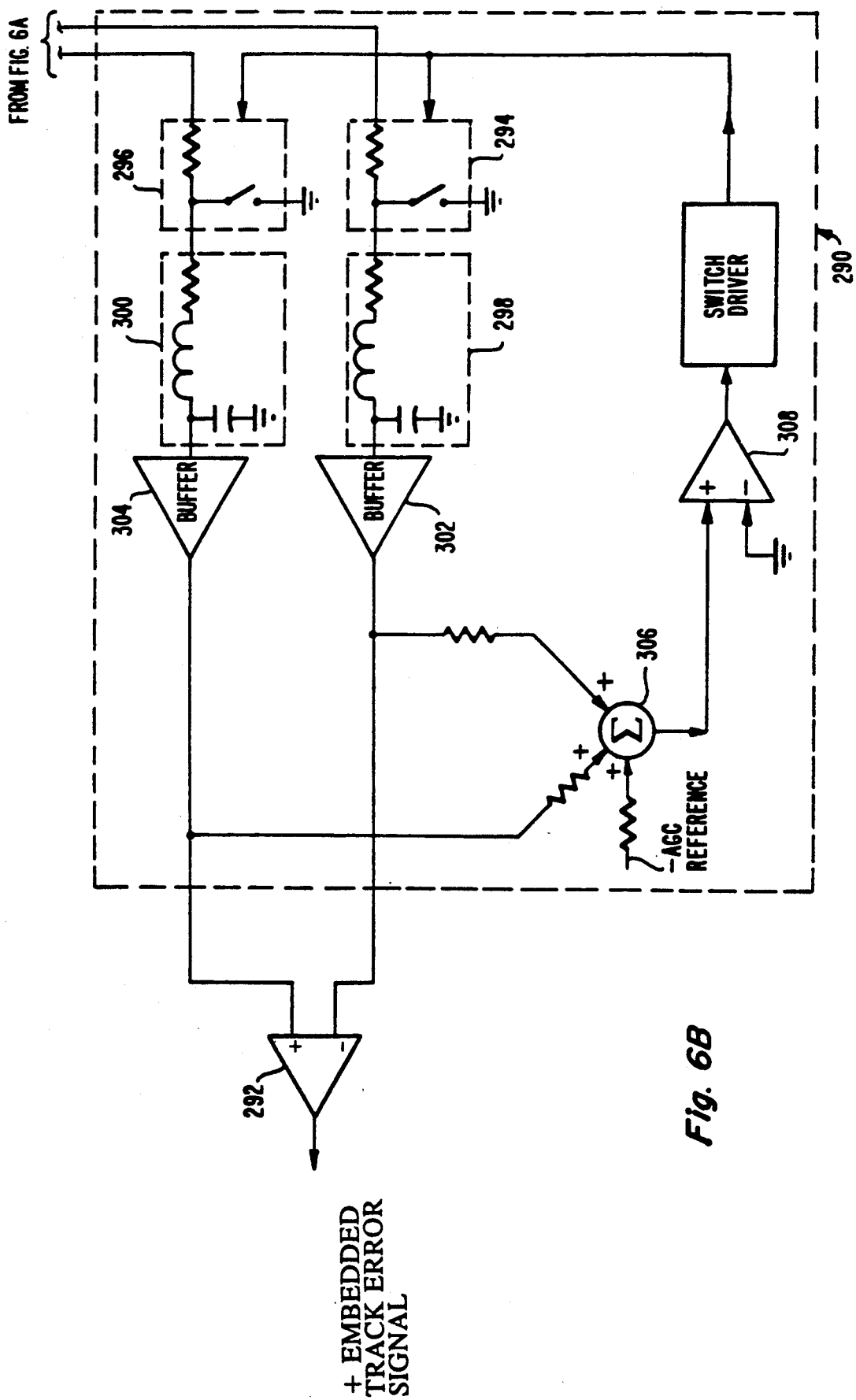

More specifically, with further reference to FIG. 6B, in the automatic gain control circuit 290, the outer and inner signals pass through switch attenuators 294 and 296, low pass filters 298 and 300, and buffer amplifiers 302 and 304. The outputs of the buffer amplifiers are applied to the differencing amplifier 292. They are also applied to a summer 306 which compares the sum of their voltages with a reference voltage. A voltage comparator 308 asserts its output whenever the sum of the output voltages of the buffer amplifiers 302 and 304 exceeds the reference voltage. In response to the assertion level, a switch driver 310 switches the attenuators 294 and 296 to their attenuating condition. With the illustrated attenuators, each of which comprises a series resistor and a shunt switch, this drops the output voltages of the attenuators, to zero. The output voltages of the low pass filters 298 and 300 thereupon begin to decrease and when their sum becomes less than the reference voltage applied to the summer 306, the comparator 308 deasserts its output. As a result, attenuators 294 and 296 are switched to their non-attenuating condition so that the output voltages of the low pass filters 298 and 300 once again begin to increase.

In operation, the attenuators 294 and 296 are rapidly cycled back and forth between their attenuating and non-attenuating conditions, the rate at which this switching occurs depending on the time constant of the low pass filters 298 and 300 and the dead band of the comparator 308. Preferably the comparator 308 has a negligible dead band and as a result the attenuators 294 and 296 are switched at a rapid rate, e.g., 1-5 MHz. The gain control circuit 290 thus has a fast response, typically of several microseconds, to changing input signal conditions and furthermore can accommodate a wide range of input signal levels.

Figure 14:
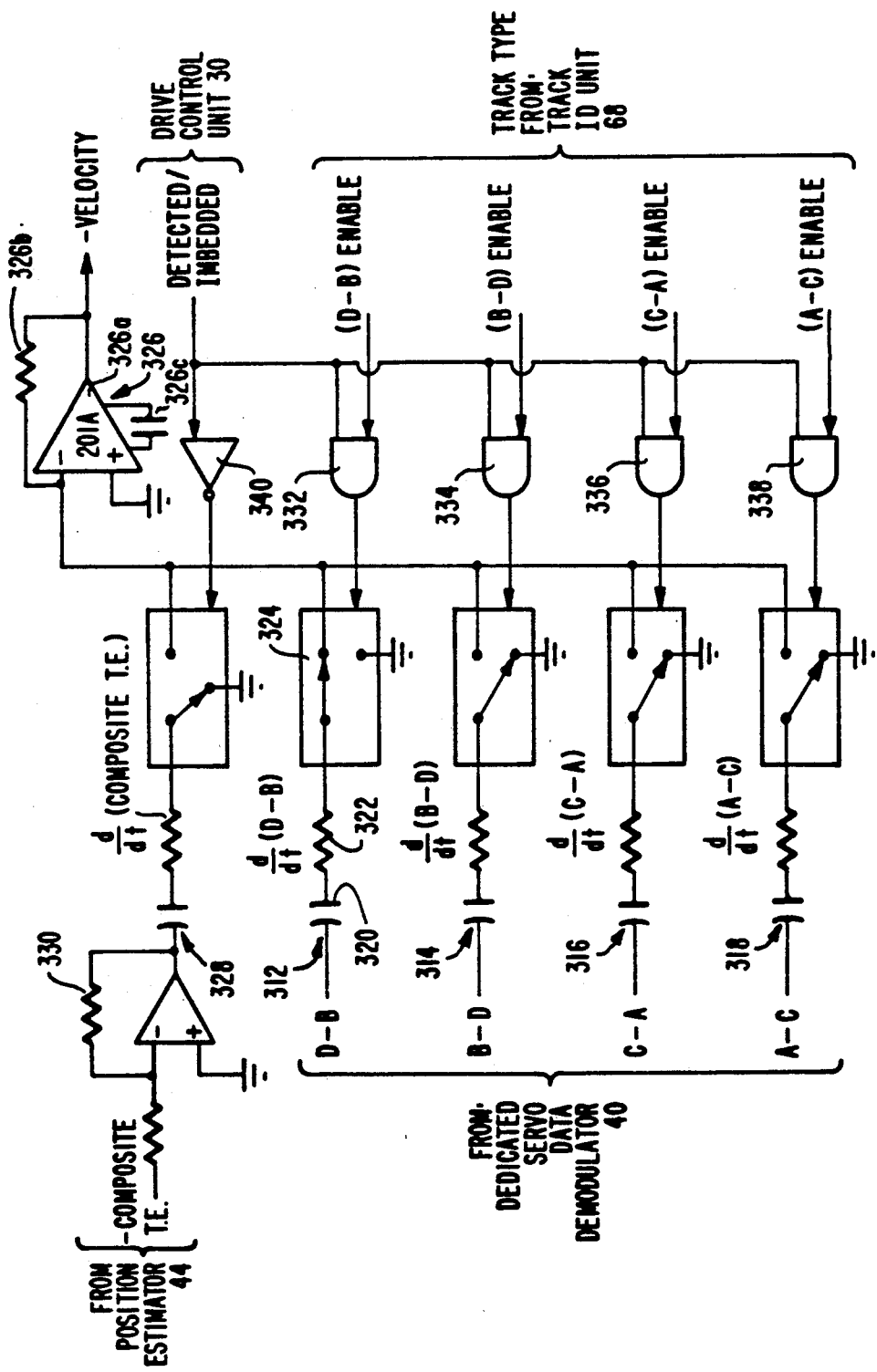
FIG. 14 is a circuit diagram of the velocity estimator of FIG. 1A.

The circuit of the velocity estimator 58 (FIG. 1A) is depicted in FIG. 14. During seek operations, the velocity estimator 58 derives its signals by differentiating the respective position error signals provided by the dedicated servo data demodulator 40 (FIG. 1B). As seen in FIG. 3B, the mid-voltage portion of the (A−C) signal occurs when the servo head is over tracks identified as "00". This mid-portion is the most linear part of the signal. Therefore, it is used for velocity estimation and also, as described below, for position estimation. For the same reasons, the (D−B) signal is used when the servo head is over an "01" track, the (C−A) signal is used when the head is over a "10" track, and the (B-D) signal is used when the head is over a "11" track. The velocity estimator 58 selects these signals by means of the track designations provided by the track identifying unit 68 (FIG. 1A).

More specifically, returning to FIG. 14, the position signals from the demodulator 40 are applied to a set of differentiator input sections 312, 314, 316, and 318, each of which comprises a series capacitor 320 and a series resistor 322, followed by a switch 324. The switches 324 are used to selectively connect the input sections 312-318 to a differentiator output section 326 that comprises an operational amplifier 326a provided with feedback by means of a resistor 326b. For velocity estimation during track following operations, the negative position error signal from the position estimator 44 (FIG. 1A) is applied to a differentiator input section 328 which includes, as an additional element, an inverter 330 because of the inverted nature of the input signal to that section.

For the two modes of normal system operation, the velocity estimator is switched by a dedicated/embedded selection signal from the drive control unit 30. When this signal is asserted, it enables a set of gates 332-338 to pass track-type signals from the identification unit 68. These signals control the switches 324 in the differentiator input sections 312-318. Thus, in accordance with the track-type identification, the appropriate input signal from the demodulator 40 is differentiated to provide the velocity output signal of the estimator 58. When the dedicated/embedded signal from the control unit 30 is deasserted, i.e., during track following operations, the output of an inverter 340 enables the switch 324 in the input section 328, so that the velocity output is derived from the composite track error signal.

A feature of the circuit is the configuration of each of the switches 324. Each switch is a two-position switch which, when enabled, connects its differentiator input section to the output section 326. When the switch is disabled, it is not merely opened, but rather it connects the input section to ground. Thus the right-hand electrode of the capacitor 320 in that section is held at ground potential. Furthermore, the input terminal of the amplifier 326b is maintained at ground potential by virtue of the negative feedback provided by the resistor 326b. Accordingly, when one of the switches 324 is enabled, the right-hand electrode of the capacitor 320 in that input section is already at the same potential as the input terminal of the differentiator output section 326. Consequently there is no current surge as a resulting of the enabling of any of the switches, with a resultant prevention of voltage spikes in the velocity signal.

The velocity estimator 58 also includes a novel arrangement for reducing the effects of high-frequency noise in the velocity signal. The differentiation that provides the velocity signal also emphasizes high-frequency noise components which can have an adverse effect on system operation. One might reduce the effect of such noise by passing the velocity signal through a low-pass filter having an appropriately high half-power frequency. However, a filter will affect the phase of signal components at lower frequencies and in particular at frequencies within the pass band of the servo loop, thereby presenting an instability problem if high loop gain is used. Instead of using a conventional low-pass filter, I reduce the noise by appropriate selection of the conventional slew rate capacitor connected to the amplifier 326a. This capacitor, which is indicated at 326c, has a substantially higher capacitance than conventional slew rate capacitors, e.g. 30 pf. Slew rate control in a conventional operational amplifier provides an essentially unaffected gain and phase characteristic out to a slew rate (frequency-amplitude combination) determined by the slew rate capacitor. At that frequency there is a sharp change in characteristics, with the gain dropping off at a rapid rate. I select the capacitance of the capacitor 326c to set the slew rate to correspond to a carriage acceleration slightly greater than the maximum acceleration of which the positioning system is capable. This substantially reduces the noise in the velocity signal while leaving unaffected the gain and phase characteristics of the servo loop.

Figure 15:
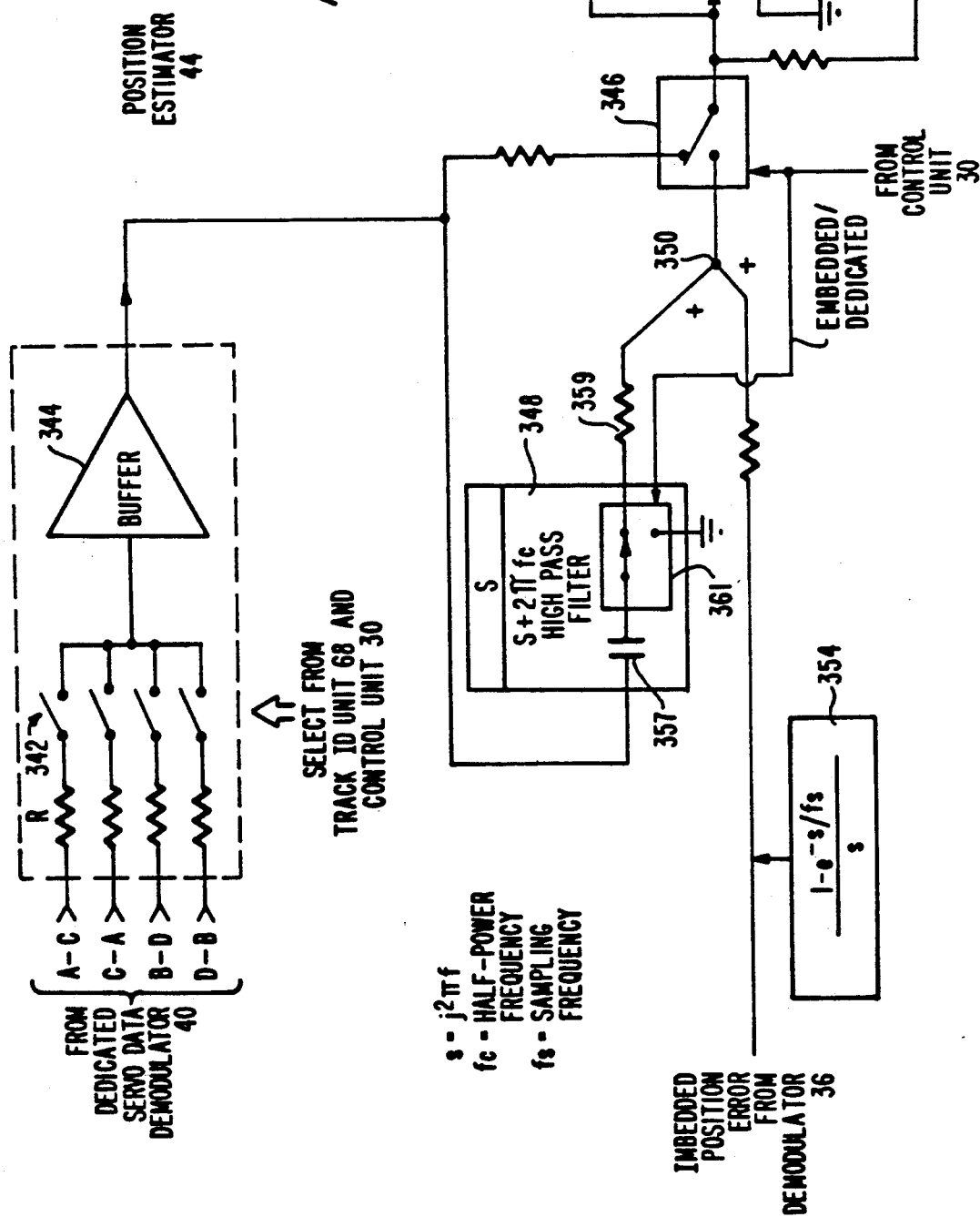
FIG. 15 is a circuit diagram of the position error estimator of FIG. 1A.

FIG. 15 depicts the circuit used in the position estimator 44. The position error signals from the dedicated servo demodulator 40 are received by a set of switches 342 which selectively apply these signals to a buffer amplifier 344. Each switch 342 is enabled in accordance with the track-type identification provided by the track identification unit 68. This applies the appropriate input signal to the amplifier 344 according to the track type over which the selected data head is positioned (FIG. 3B). The output of the amplifier 344 is applied to a selector switch 346. The same signal is also passed through a high pass filter 348 to a summing junction 350. The embedded track error from the demodulator 36 is also applied to the summing junction 350, whose output in turn is passed to the selector switch 346. The signal selected by the switch 346 is applied to the input terminal of an amplifier 352 provided with negative feedback as shown. The output of the amplifier 352 is the composite track error signal.

The switch 346 operates in response to the dedicated-/embedded signal from the control unit 30. When this signal is asserted, the switch 346 applies only the dedicated track error signal to the amplifier 352. The resulting composite track error signal is used by the servo system when the selected data head is within 2.5 tracks of the selected track centerline but is still more than one-half track distant from the centerline. When the selected head comes within a distance of one-half track from its final on-centerline position, the control unit 30 deasserts the dedicated/embedded signal so that the switch 346 connects the summing junction 350 to the amplifier 352. The composite track error is then the sum of the embedded track error and the output of the high pass filter 348. In particular, it is the sum of the embedded track error signal and the high frequency components of the dedicated track error signal. The summed signals have the characteristics indicated algebraically in the boxes 348 and 354 in FIG. 15.

Figure 16A:
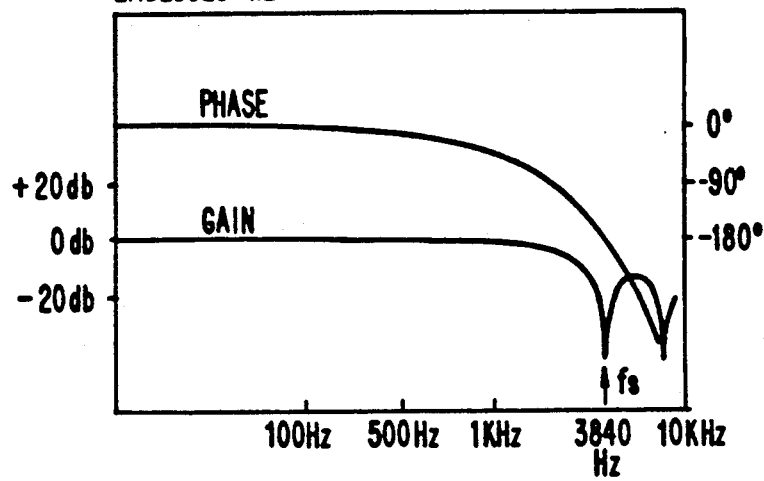
FIGS. 16A, 16B and 16C are graphic representations of frequency characteristics associated with the position error estimator.
Figure 16B:
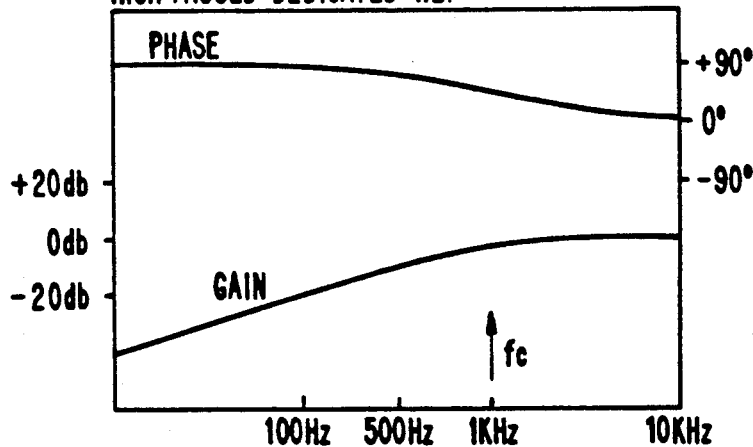

The characteristics of these signals are graphically depicted in FIGS. 16A and 16B. As shown in FIG. 16A, the frequency characteristics of the embedded position error signal, while exhibiting a high-frequency cut-off at the sampling frequency, $f_s$, are not the same as the characteristics of a low pass filter.

Specifically, this signal exhibits an appreciable phase lag at a frequency much lower than the amplitude cut-off frequency. As a result, if one is to pass the embedded error signal through a low-pass filter and the dedicated signal through a high-pass filter and then combine them as is conventionally done, the common half-power frequency of both filters has to be unduly low in order to avoid problems resulting from the phase characteristic of the embedded error signal. Indeed, in prior systems, the common half-power frequency is 100 Hz. Since the disk position servo loop commonly has a band width of the order of 500 Hz, reduction of the embedded error signal at such a low frequency results in a loss of much of the highly accurate position information contained in this signal.

I have found that a substantially improved composite error signal can be obtained by not filtering the embedded error signal, as shown in the circuit of FIG. 15. The dedicated error signal is passed through a high-pass filter having a half-power frequency much higher than in prior systems. For example, I have determined empirically that a ratio of approximately 4 to 1 between the sampling frequency of the embedded error signal and the half-power frequency of the high pass filter 348 (FIG. 15) provides a highly accurate, fast responding composite position error signal.

Figure 16C:
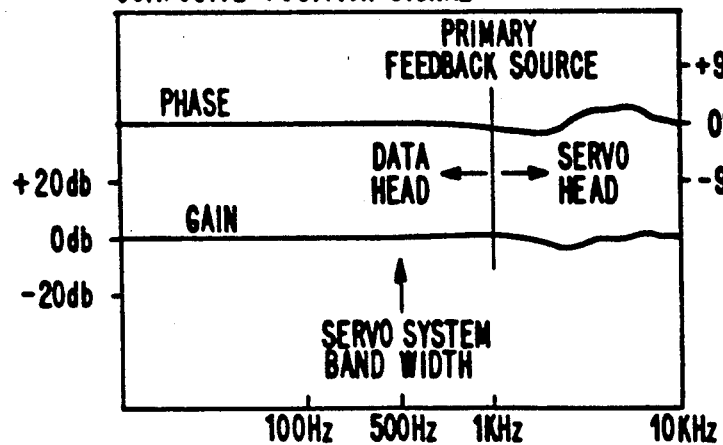

For example, assuming that each data track contains 64 sectors and the rotational speed of the disks is 3600 rpm, the sampling frequency for the embedded error signal will be 3840 Hz as indicated in FIG. 16A. With the filter 348 of FIG. 15 having a half-power frequency of 1 KHz, the filtered dedicated error signal will have the frequency characteristics exhibited in FIG. 16B. The composite signal will then have the characteristics shown in FIG. 16C. As shown therein, this signal which includes a full contribution of the embedded error position signal, has excellent phase and gain characteristics beyond the nominal 500 Hz band width limit of the servo loop. Thus the composite position error estimator described herein makes full use of the embedded position error signal without suffering from loop instability.

The position estimator 44 includes an arrangement, similar to that of the velocity estimator 58 (FIG. 14), for preventing voltage spikes when the high-pass filter 348 is switched into operation. The filter 348 includes a capacitor 357 in series with a resistor 359, a switch 361 connects the capacitor to resistor 359 when the embedded/dedicated signal is asserted. At other times it connects the capacitor to ground, the potential at the input terminal of the amplifier 352. Thus, when the filter is connected to the amplifier, it does not cause a current pulse in the amplifier input.

When the system described herein is used to write the embedded servo data onto the data disks, the position error signals must be derived solely from the dedicated servo disk. Moreover, as explained above in connection with the description of FIG. 2B, the embedded servo blocks 258 and 260 are displaced one-half track from the centerlines of the data tracks. That is, they are centered on the boundaries of the tracks. Turning to FIG. 3B, it will be seen that the (A-C), etc., error signals provided by the dedicated servo demodulator 40 of FIG. 1B can be used for such half track positioning. For example, at the boundary J between the "10" and "11" tracks, the sum of the (C—A) and (B—D) signals is 0. Moreover, the sum increases with head movement in the forward direction from that boundary and decreases with head movement in the reverse direction. Accordingly, the sum of these two signals can be used to position the data heads on the boundaries between "10" and "11" data tracks. Similarly, other additive combinations of the signals depicted in FIG. 3B can be used to position the data heads on other track boundaries for the writing of embedded servo blocks.

Referring next to FIG. 15, during track-boundary or "half-track" positioning of the data heads, control unit 30 provides selection signals to the switches 342 that select pairs of input signals in accordance with the signal pattern depicted in FIG. 3B. The sum of two selected signals is therefore applied to the buffer amplifier 344 and, with the dedicated/embedded signal asserted, this sum is used as the output from the position estimator 44 to position the data heads. To accommodate this type of operation I have included a set of equal-resistance resistors 356 in series with the switch 342. The buffer amplifier 344 has an essentially infinite input resistance. Accordingly, when a single switch 342 is enabled, the corresponding input signal is received by the buffer amplifier 344 without attenuation. On the other hand, when a pair of input signals is selected, for track-boundary operation, the two resistors 356 involved serve as voltage dividers which reduce each of the signal amplitudes by half. The sum of the two amplitudes is thus equal to the amplitude of a single input signal and the servo loop can operate with the same gain as with normal operation.

As noted above, toward the end of a seek operation, when the servo head 27 (FIG. 1) is within 2.5 track widths of the destination track, the servo positioning loop takes over. Specifically, the drive control unit 30 closes the position mode switch 54 (FIG. 1B) to apply the composite track error signal to the summer 56. Also the dedicated/embedded signal is asserted so that the track error signal consists solely of the output of the dedicated servo data demodulator 40 (FIG. 1B). Referring to FIG. 3B, assume, for example, that the destination track is a "00" track whose centerline is at the point indicated at 367. When the servo head is over that track, the (A—C) signal can be used as an position error signal. However, assuming that the head is approaching the destination track from the left, this signal cannot be used before the head arrives at the centerline of the preceding "11" track.

Accordingly, when the head arrives at the boundary K between the tracks designated "01" and "10" in FIG. 3B, the drive control unit 30 (FIG. 1B) causes the position estimator 44 (FIG. 1A) to select the (B—D) signal. At the same time, the drive control unit applies an offset to the digital/analog converter 60 corresponding to a downward shift of the (B—D) curve by an amount that makes it serve as a linear extension of the (A—C) signal at the boundary "L" between the "11" and "00" tracks. Specifically, as can be seen in FIG. 3B, the offset corresponds to a distance of one track. Than when the head reaches the track boundary "L", the drive control unit 30 removes the offset and switches the (A–C) signal to the input terminal of the position estimator 44. The servo system than continues bringing the head within the destination "00" track. At that point the control unit deasserts the dedicated/embedded signal to change the output of the position estimator 44 to a combination of the dedicate and embedded error signals as described above.

During track-boundary operations the signals from the demodulator 40 used by the position estimator 44 are derived from all four of the servo signals (A, B, C, and D) in the dedicated servo tracks. Accordingly with reference to FIG. 8, a half-track signal from the control unit 30 causes the selector switch 128 to select, for automatic gain control feedback, the sum of all of these signals.

The illustrated disk drive also includes provisions for applying corrections to the composite position error signals. These corrections are of two types: one is compensation for various offset or zero shift factors in the system. The net effect of these factors is to shift the zero point of the composite track error signal, with the result that the system maintains the heads at positions displaced from the desired track centerline positions. The second type of correction is of a more dynamic nature. It compensates for such factors as track runout and bias forces exerted on the carriage 20 (FIG. 1B). These factors are functions of the angular position of the disks and the radial position of the heads, respectively.

Some of the offset errors are corrected by an offset correction voltage injected into the position estimator 44 (FIG. 15) by an offset correction digital/analog converter 358 (FIG. 1A). Others are corrected by adjustment of the digital signals applied to the velocity command digital/analog converter 60. The drive control unit 30 of FIG. 1B is programmed to run through the following routine to ascertain and apply the various offset correction factors.

First, with reference to FIG. 1A, the control unit 30 applies a ground calibrate signal to a low pass filter 360 which normally receives its input signal from the position estimator 44 and applies its output signal to an analog/digital converter 362. The ground calibrate signal grounds the input of the filter 360 and the drive control unit 30 takes in the output of the converted 362. Any output other than zero indicates an offset within the combination of the filter 360 and converter 362.

The control unit 30 then deasserts the ground calibrate signal and applies a calibration generation enable signal to the embedded servo data demodulator 36 (FIG. 1B). As shown in FIG. 6A, this signal enables a square wave generator 364 that applies its square wave signal to the summing junction 264 at the input of the demodulator 36. The head selection unit 32 is shut off and the squarewaves from the generator 364 thus provide the only input to the demodulator 36. If there is any zero offset in the demodulator, it will then appear as an output signal from the demodulator 36.

Returning to FIG. 1A, the drive control unit also loads a content of zero into the digital/analog converter 358 so that any offset in the converter will be applied to the position estimator 44 along with any offset in the embedded servo data demodulator 36. Furthermore, the control unit 30 asserts the dedicated/embedded signal. The composite track error from the position estimator 44 thus includes the offsets of the demodulator 36 and the digital/analog converter 358. It does not include any offsets from the dedicated servo data demodulator 40, since those are excluded by the high pass filter 348 (FIG. 15).

The two offsets to be measured are thus passed by the low-pass filter 360 to the analog/digital converter 362 and the drive control unit 30 then takes in the resulting digital representation of the sum of those two offsets. It modifies the sum in accordance with the previously measured offset in the filter 360 and converter 362. It then uses this number as the basis for adjusting converter 358 and iterates until a correction value is established that makes the composite TE voltage essentially zero. Finally, it stores the result in a memory 363. During track-following operations, the control unit 30 applies the result to the digital/analog converter 358. The converter 358 thus feeds the position estimator 44 with a correction voltage that compensates for the offsets in the demodulator 36 and converter 358.

During normal track-following operations of the system, offsets in the output of the dedicated servo demodulator 40 are insignificant to system operation since they are removed by the high pass filter 348 (FIG. 15). However, the d.c. components in the outputs of the demodulator 40 are used in maintaining the data heads at their track boundary positions when the system is used to write the embedded servo signals on the data surfaces. With reference to FIG. 3B, consider, for example, the graphical representation of the (A−C) signal as a function of head position. This signal has a nominal zero value at the track centerlines designated at 365, 366, and 367. In particular, the signal undergoes a complete cycle as the servo head moves from the centerline 365 to the centerline 367. If there is an offset in this signal there will be a displacement of the zero points so that the distance from the zero point 365 to the zero point 366 will differ from the distance from the zero point 366 to the zero point 367. The system calculates the offset in effect by measuring these distances.

Figure 17:
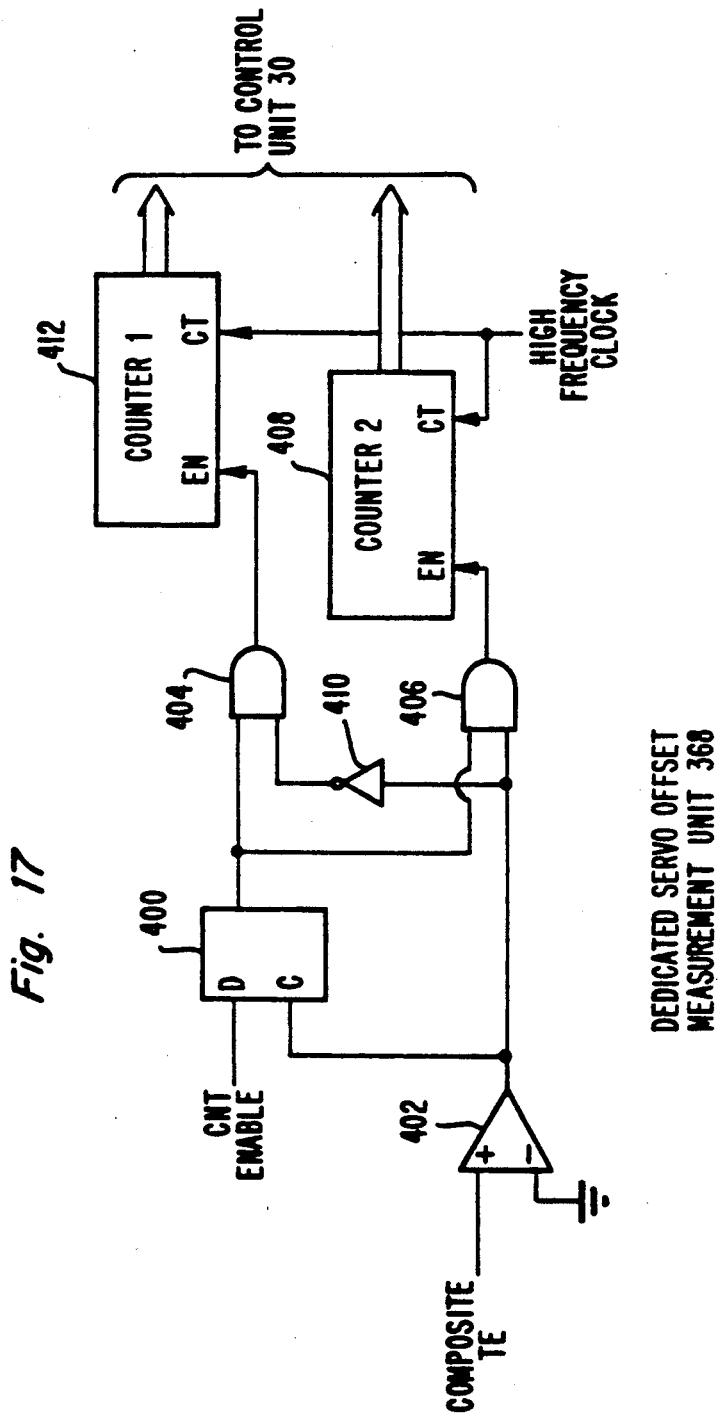
FIG. 17 is a circuit diagram of the dedicated servo offset measurement unit of FIG. IA.

More specifically to measure the offset in the (A−C) signal, the drive control unit 30 deasserts the dedicated-/embedded signal, selects one of the input signals, e.g., (A−C), for the position estimator 44 and initiates a slow speed constant velocity seek operation. At the same time, it activates a dedicated servo demodulator offset measurement unit 368. The circuit for the measurement unit 368 is illustrated in FIG. 17. The control unit 30 asserts a count enable signal that enables a flip-flop 400. The composite track error signal from the position estimator 44 is applied to a comparator 402 and when the track error signal undergoes a positive-going transition, it clocks the flip-flop 400 and thereby sets it. This enables a pair of gates 404 and 406. The gate 406 thus passes the output of the comparator 402 to the enable input of a counter 408. The counter thereupon begins counting pulses from a high frequency clock. When the position error signal undergoes a transition to the negative portion of its characteristic, the comparator 402 deasserts its output, thereby disabling the counter 408. However, by way of an inverter 410, comparator output enables a second counter 412 to count the clock pulses. The counter 412 is then disabled during the next transition of the comparator 402 output. It will then be seen that the counter 408 counts during positive portions of the (A−C) signal and the counter 412 counts during the negative portions. This operation continues, with the counters counting the intervals of successive positive and negative portions of the error signal, a substantial number of such intervals being counted to reduce the effects of noise. When the control unit 30 determines that the sum of the contents of counters 408 and 412 reach a predetermined level it deasserts the count enable signal and the next rising transition from the comparator 402 clocks the flip-flop 400, thereby resetting the flip-flop and disabling the gates 404 and 406. With this arrangement, the counters 408 and 412 measure the lengths of an equal number of "half-cycles" of the signal.

The difference in the contents of the counters 408 and 412 is a measure of the offset of the (A−C) error signal. The drive control unit 30 calculates an appropriate change in correction value. It then uses this number as the basis for adjusting converter 358 and iterates this procedure until a correction value is established that makes the effective measured offset in the composite TE signal essentially zero. Finally, it stores the correction value in the memory 363. The operation is then repeated for the other output signals from the demodulator 40 (FIG. 1B). The correction values thus obtained are then sent to the offset correction digital/analog converter 358 (FIG. 1A) during writing of the embedded servo signals. Specifically, the drive control unit 30 applies the average of the offset corrections for each pair of signals from the demodulator 40 used by the position error estimator 44 during servo writing.

Finally, the drive control unit measures the carriage bias force and the track runout, the latter measurement being made separately for each disk in the disk assembly 10. The corrections required to compensate for these offsets are stored in memories 370 and 372 (FIG. 1B). The control unit 30 applies the sum of these corrections to the digital/analog converter 52 (FIG. 1A) in accordance with the radial position of the heads (bias force) and the angular position of the disks (runout). While there are a number of available methods for ascertaining these corrections, I prefer to use the method disclosed in my copending application referenced above.

The invention also relates to the method in which the servo signals are written on the dedicated servo surface. The servo head 27 has a width of two servo tracks, as explained above. It can thus write an entire A, B, C or D dibit at one time. Assume that the servo surface were to be written in a conventional manner beginning at the top of FIG. 2A. The data head would switch to a full positive current, then to a full negative current in writing the first S1 dibit, the negative current would remain on until the beginning of the S2 dibit when it would switch to full positive and then a full negative value to write that dibit. On arriving at the position of the A dibit, the polarity of the head current would again reverse to positively polarize the magnetic medium and then switch to a negative value to negatively polarize it. Ignoring for the purposes of this explanation the presence of a portion of a D dibit, the head would continue to magnetize the medium in the negative direction until the position of the next S1 dibit. Thus, in the region between dibits, the medium would be polarized in the negative direction. This background polarization is required to ensure the absence of spurious signals in reading from the disk.

After completion of the first revolution of the disk surface, the head would be moved downward (FIG. 2A) by one track to write the B dibits. One way to accomplish this would be to proceed as in the previous revolution and rewrite the lower halves of the A dibits, with the negative current in the head remaining until the positions of the B dibits are reached, then switching the head current to the positive and then to negative direction to write the B dibits.

This procedure presents two problems. In the first place it is difficult, if not impossible, to write a new lower half of a dibit that will be essentially exactly aligned with the upper half. This misalignment is acceptable in the synchronizing dibits, but in the positioning dibits it adversely affects the position-sensing capability of the system. To overcome this problem, one might turn off the writing current before reaching each A dibit and then turn it on again before reaching the position of the succeeding B dibit. However, this would not solve the second problem, which would occur during the writing of the C dibits.

Specifically, when the head is moved to the next track to write the C dibits, it would have to polarize the medium in the intervals from the S2 dibits to the B dibits. In passing the A dibits, the fringe fields from the head would change the magnetizations in the lower portions of the A dibits. This in turn would alter the characteristics of the signal received from the A dibits and, in particular, would adversely affect the linearity of the received signal as a function of the radial position.

I have overcome these problems by first pre-polarizing the entire disk surface with the desired background or interbit polarization. In that case, when writing the C dibits, for example, the servo head need not polarize the disk in the region below the A dibits, that polarization having been accomplished before the A dibits were written. Thus the A dibits are unaffected by the writing of the C dibits. To write the C dibits, for example, the servo head is turned off after the writing of the S2 dibit. It is turned on again in the negative (background) direction after passing the B dibits. This causes no change in the magnetic surface since it is already polarized in the same direction. Then, when the position of a C dibit is reached, the polarity is switched to the positive direction and then back again to the negative direction to write the dibit. It is left on just long enough to write the C dibit and is turned off before the D dibit period. With this procedure I have obtained the linearity of the position signals derived from the positioning dibits required for close tolerance operation of the head-positioning system.

What is claimed as new and desired to be secured by Letters Patent of the United States is:

1. In a disk drive incorporating a disk assembly comprising at least one data surface having circular data tracks containing sectors each of which includes a data field and a servo field providing embedded servo signals, a sensor for sensing said embedded servo signals and a head positioning system for positioning said sensor over a selected data track, the embedded servo signals in each servo field comprising first and second substantially constant amplitude high-frequency bursts consisting of transitions of alternating polarity, and said first and second bursts being disposed on opposite sides of the centerline of the track containing them and offset relative to each other in the circumferential direction, a circuit for providing an embedded track error signal to which said head positioning system responds, said track error signal generating circuit comprising:

A) a rectifier connected to rectify the sensed servo signals to provide a rectified signal output;
   B) a resettable integrator connected to separately integrated the rectified output corresponding to each of said bursts to provide servo signal outputs corresponding to the strengths of the sensed servo signals;

C) means for sampling the servo signal outputs corresponding to each of said bursts; and D) means for comparing the sampled outputs from the bursts on one side of the track centerline with the sampled outputs from the bursts on the other side of the centerline to provide said track error signal.

2. The track error signal generating circuit of claim 1 further comprising a bandpass filter connected between the servo signal sensor and the rectifier to pass signals at said high frequency.

3. The track error signal generating circuit of claim 2 in which a square-wave generator is connected to provide the sole input to the bandpass filter to sense zero offset in the track error signal generating circuit.

4. The track error signal generating circuit of claim 1 wherein the sampling means comprises sample-and-hold circuits activated and reset according to timing signals corresponding to the expected sensing of embedded track error signals and the integrator is enabled and reset according to said timing signals.

5. In a disk drive incorporating a disk assembly comprising at least one data surface having circular data tracks containing sectors each of which includes a data field and a servo field providing embedded servo signals, a sensor for sensing said embedded servo signals and a head positioning system for positioning a read-/write head over a selected data track, the embedded servo signals in each servo field comprising first and second substantially constant amplitude high-frequency bursts consisting of transitions of alternating polarity, and said first and second bursts being disposed on opposite sides of the centerline of the track containing them and being offset relative to each other in the circumferential direction, a circuit for generating an embedded track error signal to which said head positioning system responds, said track error signal generating circuit comprising:

A) a rectifier connected to rectify the sensed servo signals to provide a rectified signal output;

B) a low-pass filter connected to smooth the rectified output corresponding to each of said bursts to provide servo signal outputs corresponding to the strengths of the sensed servo signals;

C) means for sampling the servo signal outputs corresponding to each of said bursts; and D) means for comparing said sampled outputs from the bursts on one side of the track centerline with the sampled outputs from the bursts on the other side of the centerline to provide said track error signal.

6. The track error signal generating circuit of claim 5 further comprising a bandpass filter connected between the servo signal sensor and the rectifier to pass signals at said high frequency.

7. The track error signal generating circuit of claim 6 in which a square-wave generator is connected to provide the sole input to the bandpass filter to sense zero offset in the track error signal generating circuit.

8. The track error signal generating circuit of claim 5 wherein the sampling means comprises sample-and-hold circuits activated and reset according to timing signals corresponding to the expected sensing of embedded track error signals.

9. For a disk drive incorporating a disk assembly comprising at least one data surface having circular data tracks containing sectors each of which includes a data field and a servo field providing embedded servo signals, a sensor for sensing said embedded servo signals and a head positioning system for positioning said sensor over a selected data track, the embedded servo signals in each servo field comprising first and second substantially constant amplitude high-frequency bursts consisting of transitions of alternating polarity, and said first and second bursts being disposed on opposite sides of the centerline of the track containing them and offset relative to each other in the circumferential direction, a method for providing an embedded track error signal to which said head positioning system respond, said method comprising:

A) rectifying the sensed servo signals to provide a rectified signal output;

B) smoothing the rectified output corresponding to each of said bursts to provide servo signals outputs corresponding to the strengths of the sensed servo signals;

C) sampling the servo signal outputs corresponding to each of said bursts; and

D) comparing the sampled outputs from the bursts on one side of the track centerline with the sampled outputs from the bursts on the other side of the centerline to provide said track error signal.

10. The method of claim 9 further comprising the step of calibration using a constant amplitude square as the servo signal input to determine zero offset.

* * * * *